US010567906B1

(12) United States Patent
Iqbal et al.

(10) Patent No.: US 10,567,906 B1
(45) Date of Patent: Feb. 18, 2020

(54) USER ADAPTED LOCATION BASED SERVICES

(71) Applicant: International Business Machines Corporation, Armonk, NY (US)

(72) Inventors: Mickey Iqbal, Coppell, TX (US); Clea A. Zolotow, Key West, FL (US); John V. Delaney, Mulhuddart (IE); Andrew Barnes, Mulhuddart (IE); Julian Kopp, Mannheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/203,173

(22) Filed: Nov. 28, 2018

(51) Int. Cl.
*G08B 27/00* (2006.01)
*H04W 4/021* (2018.01)
*H04W 4/02* (2018.01)
*G06F 9/455* (2018.01)
*G06F 16/182* (2019.01)

(52) U.S. Cl.
CPC ........ *H04W 4/021* (2013.01); *G06F 9/45558* (2013.01); *G06F 16/1824* (2019.01); *H04W 4/025* (2013.01); *G06F 2009/45562* (2013.01); *G06F 2009/45595* (2013.01)

(58) Field of Classification Search
CPC ....... H04L 43/16; H04L 67/104; H04L 67/10; H04W 4/06; H04W 4/023; H04W 4/40; H04W 4/021; G06Q 30/0257; G06F 17/30241
USPC ......... 705/14.55; 455/404.1, 456.3; 235/385; 340/539, 539.1
See application file for complete search history.

(56) References Cited

U.S. PATENT DOCUMENTS

| | | | |
|---|---|---|---|
| 8,624,727 B2 | 1/2014 | Saigh | |
| 9,098,866 B1 | 8/2015 | Gurin | |
| 9,341,487 B2 | 5/2016 | Bonhomme | |
| 9,549,287 B2 | 1/2017 | Baran | |
| 9,717,845 B2 | 8/2017 | Istoc | |
| 9,875,251 B2 | 1/2018 | Jones | |
| 2012/0209657 A1 | 8/2012 | Connolly | |

(Continued)

OTHER PUBLICATIONS

P. Mell, et al. "The NIST Definition of Cloud Computing", NIST Special Publication 800-145, Sep. 2011, Gaithersburg, MD.

(Continued)

*Primary Examiner* — Phuoc H Doan
(74) *Attorney, Agent, or Firm* — Brian M. Restauro, Esq.; George S. Blasiak, Esq.; Heslin Rothenberg Farley & Mesiti PC

(57) ABSTRACT

Methods, computer program products, and systems are presented. The method computer program products, and systems can include, for instance: examining location data of a client computer device in reference to a geofence, the client computer device being associated to a certain user, the geofence being associated to a certain enterprise venue; in response to a breach of the geofence by the client computer device, initiating a process to obtain user associated data of the certain user; providing, while the client computer device is located within the geofence, one to more output observable by the certain user in dependence on data of the user associated data obtained by the initiated process; and in response to an exiting of the geofence by the client computer device terminating the process to obtain user associated data of the certain user.

20 Claims, 11 Drawing Sheets

(56) References Cited

U.S. PATENT DOCUMENTS

| | | |
|---|---|---|
| 2014/0279123 A1 | 9/2014 | Harkey |
| 2014/0287779 A1* | 9/2014 | O'Keefe ............... H04W 4/02 455/456.3 |
| 2015/0278865 A1 | 10/2015 | Jain |
| 2015/0371303 A1 | 12/2015 | Suri |
| 2017/0061442 A1 | 3/2017 | Barlow |

OTHER PUBLICATIONS

S. Pongpaichet, "*Situation fencing: making geo-fencing personal and dynamic.*" In Proceedings of the 1st ACM international workshop on Personal data meets distributed multimedia (PDM '13). ACM, New York, NY, USA, 3-10, 2013.

HIPAA Journal, "*Mobile Devices Under HIPAA Rules: Will Geofencing Boost Data Security?*" https://www.hipaajournal.com/mobile-devices-hipaa-rules-geofencing-data-security-443/ Mar. 21, 2015 [Accessed Feb. 16, 2018].

S. Talaat, "*Geo-Fencing & Time-Fencing Feature.*" Mar. 21, 2015 [Accessed Feb. 16, 2018] https://microsoftintune.uservoice.com/forums/291681-ideas/suggestions/8345325-geo-fencing-time-fencing-feature.

T. Phan, "10 Geofencing Strategies to Personalize Experiences in Hospitality—Geofencing, Location Marketing." https://bluedotinnovation.com/10-geofencing-strategies-personalize-experiences-hospitality.html Dec. 15, 2016 [Accessed Feb. 16, 2018].

Anonymous, "System and Method for Defining and Enforcing Data Localization." IP.com Disclosure No. IPCOM000247196D, Publication Date: Aug. 16, 2016.

A. Garg, "Smart Geo-fencing with Location Sensitive Product Affinity." In Proceedings of the 25th ACM SIGSPATIAL International Conference on Advances in Geographic Information Systems (SIGSPATIAL'17), Erik Hoel, Shawn Newsam, Siva Ravada, Roberto Tamassia, and Goce Trajcevski (Eds.). ACM, New York, NY, USA, Article 39, 10 pages. 2017.

U. Bareth, "geoXmart—A Marketplace for Geofence-Based Mobile Services," 2010 IEEE 34th Annual Computer Software and Applications Conference, Seoul, 2010, pp. 101-106.

\* cited by examiner

USER ADAPTED LOCATION BASED SERVICES

BACKGROUND

Location based services (LBS) are software services that use location data to control functionality of computer systems LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WI-FI based locating technologies, and other technologies. One example of an LBS is a location based messaging services wherein notifications and other messages to users can be in dependence on the respective locations of the users.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

SUMMARY

Shortcomings of the prior art are overcome, and additional advantages are provided, through the provision, in one aspect, of a method. The method can include, for example: examining location data of a client computer device in reference to a geofence, the client computer device being associated to a certain user, the geofence being associated to a certain enterprise venue; in response to a breach of the geofence by the client computer device, initiating a process to obtain user associated data of the certain user; providing, while the client computer device is located within the geofence, one to more output observable by the certain user in dependence on data of the user associated data obtained by the initiated process; and in response to an exiting of the geofence by the client computer device terminating the process to obtain user associated data of the certain user.

In another aspect, a computer program product can be provided. The computer program product can include a computer readable storage medium readable by one or more processing circuit and storing instructions for execution by one or more processor for performing a method. The method can include, for example: examining location data of a client computer device in reference to a geofence, the client computer device being associated to a certain user, the geofence being associated to a certain enterprise venue; in response to a breach of the geofence by the client computer device, initiating a process to obtain user associated data of the certain user; providing, while the client computer device is located within the geofence, one to more output observable by the certain user in dependence on data of the user associated data obtained by the initiated process; and in response to an exiting of the geofence by the client computer device terminating the process to obtain user associated data of the certain user.

In a further aspect, a system can be provided. The system can include, for example a memory. In addition, the system can include one or more processor in communication with the memory. Further, the system can include program instructions executable by the one or more processor via the memory to perform a method. The method can include, for example: examining location data of a client computer device in reference to a geofence, the client computer device being associated to a certain user, the geofence being associated to a certain enterprise venue; in response to a breach of the geofence by the client computer device, initiating a process to obtain user associated data of the certain user; providing, while the client computer device is located within the geofence, one to more output observable by the certain user in dependence on data of the user associated data obtained by the initiated process; and in response to an exiting of the geofence by the client computer device terminating the process to obtain user associated data of the certain user.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
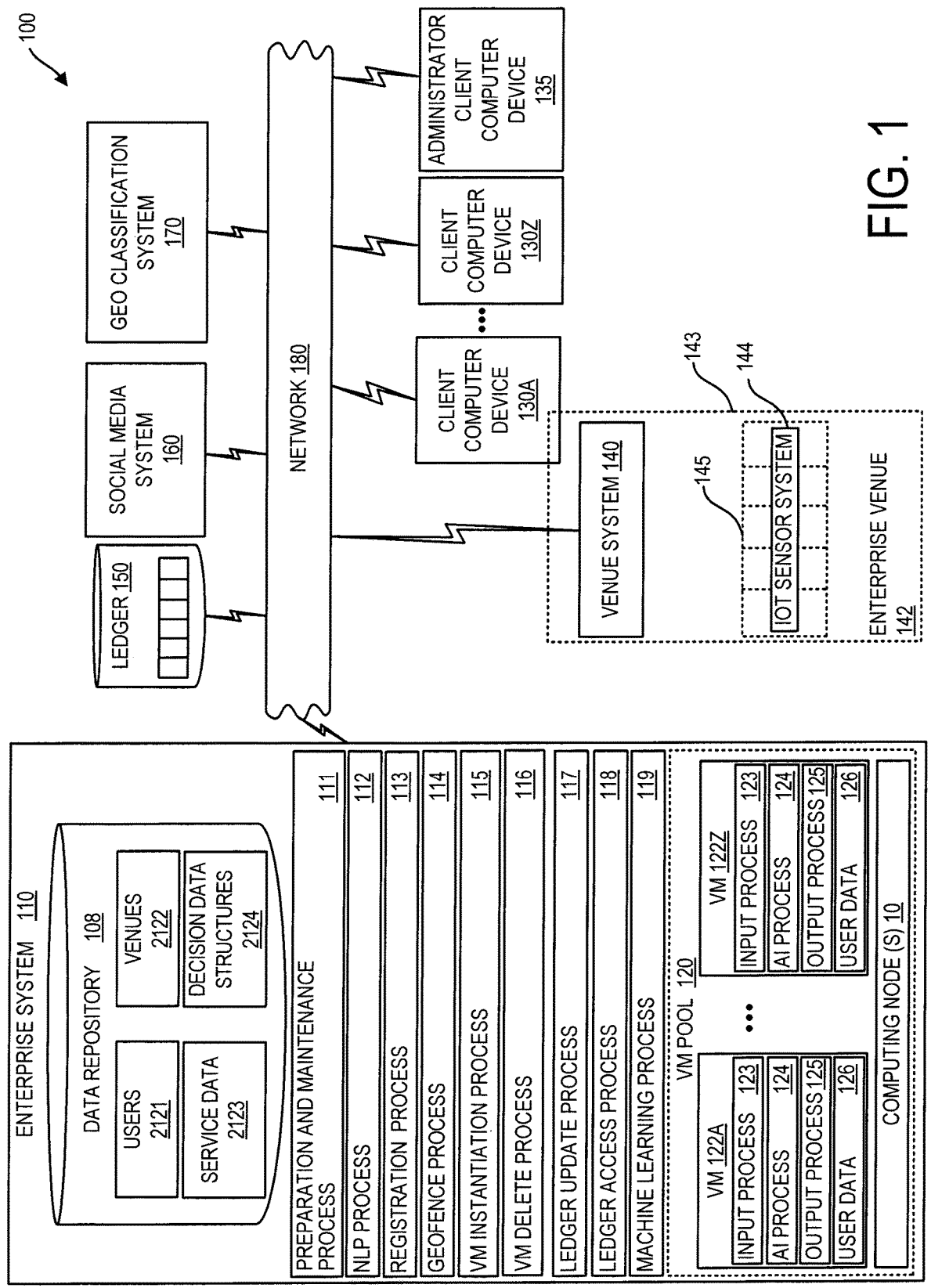
FIG. 1 is a block diagram of a system having an enterprise system, client computer devices, an administrator client computer device, a venue system, a ledger, a social media system, and a geoclassification system according to one embodiment.

System 100 for use in providing location based services to users is set forth in FIG. 1. System 100 according to one embodiment, can include enterprise system 110 having data repository 108, client computer devices 130A-130Z, administrator client computer device 135, venue system 140, ledger 150, social media system 160, and geoclassification system 170, in communication with one another via network 180. Enterprise system 110, client computer devices 130A-130Z, administrator client computer device 135, venue system 140, ledger 150, social media system 160, and geoclassification system 170 according to one embodiment can be provided by computing node based devices and systems. Network 180 may be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

According to one embodiment enterprise system 110, client computer devices 130A-130Z, administrator client computer device 135, venue system 140, ledger 150, social media system 160, and geoclassification system 170 can be external and remote from one another. According to one embodiment, one or more of enterprise system 110, client computer devices 130A-130Z, administrator client computer device 135, venue system 140, ledger 150, social media system 160, and geoclassification system 170 can be collocated with one another.

Client computer devices 130A-130Z may be used by respective users of system 100. Each client computer devices 130A-130Z can have a respective user. Client computer devices 130A-130Z according to one embodiment can be provided by mobile client computer devices, e.g. a smartphone, a laptop, a smartwatch, and the like. Administrator client computer device 135 may be used by an administrator user to configure enterprise system 110.

According to one embodiment ledger 150 can be immutable ledger and can be provided by a blockchain ledger. Ledger 150 can include a list of records called blocks which can be linked together using cryptography. Each block of ledger 150 can include a cryptographic hash of a previous block, a timestamp, and transaction data, e.g. as can be represented by a Merkle Tree Root Hash. Ledger 150, which can be provided by a blockchain ledger, can be resistant to modification of data. Ledger 150 can be configured so that once a block of data is recorded into ledger 150 the data cannot be altered retroactively without alteration of all subsequent blocks. According to one embodiment, alteration of ledger 150 can be restricted and according to one embodiment can be permissible, e.g. only on consensus of a network majority. Each block of a blockchain can include a hash (that is a digital fingerprint or unique identifier), timestamp batches of recent valid transactions, and the hash of the previous block. A previous block hash can link the blocks together and prevent any block from being altered, or a block from being inserted between two existing blocks and this way each subsequent block strengthens the verification of the previous block and hence the entire block chain. Ledger 150 shown in FIG. 1 can be a distributed a ledger that can be distributed to be associated with each various member nodes, where member nodes are member nodes of a blockchain network having access to ledger 150. Ledger 150 shown in FIG. 1 can be an instance of ledger 150 configured as a database that is associated to enterprise system 110.

Enterprise system 110 can be configured to provide location based services to users. Embodiments herein recognize that certain service providers, such as hospitality service providers, are ill-equipped to provide services that are adapted to specialized and particular needs of customer users. Service providers attempt to satisfy the needs of their users by employing guesswork and providing services in a manner that is constant for all users. Embodiments herein can provide location based services wherein based on a user breaching a geofence associated to a enterprise venue a user securely grants access to user associated data of the user to an enterprise operating the venue for use by the enterprise to customize and optimize services to the user. Features can include for guaranteed secure delivery and use of user associated data to an enterprise and guaranteed user associated data destruction by the enterprise. Features can be employed for enhanced data security, e.g. automated container instantiation destruction based on geofence processing. Features can include use of ledger 150, such as a blockchain ledger, for providing guaranteed container and user associated data destruction.

Referring to FIG. 1, client computer devices 130A-130Z can be carried by their users between various locations such as locations internal and external to geofence 143 associated to enterprise venue 142. Enterprise venue 142 can be an enterprise venue operated by an enterprise. Enterprise venue 142 according to on embodiment can be provided by a hospitality enterprise venue, e.g. a hotel, a restaurant, and the like. Disposed within enterprise venue 142, venue system 140, which can be in communication with Internet of Things (IoT) sensor system 144, also disposed within enterprise venue 142. Geofence 143 associated to enterprise venue 142 according to one embodiment can be a geofence having a perimeter that traces the physical boundaries of enterprise venue 142. According to one embodiment, geofence 143 can be a perimeter larger that encompassing a boundary of enterprise venue 142, e.g. can be uniformly spaces N miles from a border of enterprise venue 142. Enterprise system 110 can be provisioned to provide location based services to users of enterprise venue 142 who are also users of respective client computer devices 130A-130Z. To provide services, enterprise system 110 can obtain and process data from venue system 140 as well as from other sources, such as client computer devices 130A-130Z, social media system 160, and geoclassification system 170.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Enterprise system 110 can include a messaging system in one embodiment. During a process of registration wherein a user of system 100 registers as a registered user of system 100, a user sending registration data can send with permission data defining the registration data a permission that grants access by enterprise system 110 to data of the user within social media system 160. On being registered, enterprise system 110 can examine data of social media system 160 e.g. to determine whether first and second users are in communication with one another via a messaging system of social media system 160. A user can enter registration data using a user interface displayed on a client computer device of client computer devices 130-130Z. Entered registration data can include e.g. name, address, social media account information, other contact information, biographical information, background information, preferences information, and/or permissions data e.g. can include permissions data allowing enterprise system 110 to query data of a social media account of a user provided by social media system 160 including messaging system data and any other data of the user. When a user opts-in to register into system 100 and grants system 100 permission to access data of social media system 100, system 100 can inform the user as to what data is collected and why, that any collected user associated data may be encrypted, that the user can opt out at any time, and that if the user opts out, any user associated data of the user is deleted.

Geo-classification system 170 can associate venues to spatial coordinate ranges associated to the venues. Geo-classification system 170 can include enhanced spatial maps pre-marked with tags to indicate uses associated with map features. Map features can include venues having associated venue areas including venue building areas and/or associated venue parking areas. An enhanced map can include tag specifying usage classifications of venues, e.g. residential, business, public and the like. An enhanced map can be tagged to tag features of a map including e.g. roads, bodies of water and infrastructure features such as building walls (exterior and interior) defining enterprise venues. In some cases an enhanced map can be tagged so that that different parts of a building are tagged differently, e.g. a doorway can be tagged differently from a conference room. Geo-classification system 170 can provide data tags associated to locations that specify uses associated with various locations. Geo-classification system 170 can cognitively map venues identified by venue identifiers, e.g. names, addresses, classifications, and the like, to coordinate location ranges associated to the various venues. Accordingly, enterprise system 110 querying geo-classification system 170, with location data in the form of coordinate location data, can return an identifier venue. Further, geo-classification system 170 can cognitively map venues that are listed in geo-classification system with uses associated with such venues, e.g. whether such venues are for residential use or business use and include a variety of additional or alternative use classifications, e.g. public use, roadway use, waterway use, and the like. An enhanced map can be tagged to tag features of a map, including e.g. roads, bodies of water and venues. Venues can be provided e.g. by open spaces, such as developed open spaces or undeveloped open spaces, buildings such as open roof building or closed roof buildings, and/or open spaces associated to buildings, such as building associated with a parking lot. For each venue, geo-classification system 170 can associate e.g. identifiers for the venue, ranges and coordinate locations associated with the venue, features associated to the venue, such as building infrastructure features, parking lot features, and other features. Geo-classification system 170 according to one embodiment can be provided by GOOGLE MAPS® (GOOGLE MAPS® is a registered trademark of Google, Inc.).

Data repository 108 can store various data. In users area 2121 data repository 108 can store data on users of system 100. Data of users area 2121 can include, e.g. assigned Unique Universal Identifiers (UUIDs) assigned by enterprise system 110 when users register into system 100. Data associated to users in users area 2121 can include, e.g. preferences of users as may be determined, e.g. by examination of survey data provided by users and/or by examination of social media system 160 and/or by examination of data of client computer devices 130-130Z. On registration, users may grant enterprise system 110 access to post data of users which allows enterprise system 110 to process post data, e.g. by performance of natural language processing (NLP) processes, as will be set forth herein. Preferences data of users area 2121 can include historical timestamped data values. Preferences data can include, e.g. topics of interests of users as well as other data such as temperature preference data of users, lighting preference data of users, wakeup and sleeping preferences of users, nutritional (dietary) preference data of users, and/or fitness preference data of users. Enterprise system 110 for determining preferences of users can examine data of various sources, e.g. survey data which can be provided on registration, user associated data of social media system 160, as well as user associated data including application data of a client computer device of client computer devices 130A-130Z, e.g. applications such as nutritional applications which can include nutritional preference data and fitness applications which can include, e.g. fitness preference data. Environmental condition preference data such as temperature and lighting preference data can be obtained, e.g. from survey data and/or by examination of data from IoT sensor system 140 attributable to manual settings of users. IOT sensor system 140 can include IOT sensors distributed within subareas 145 e.g. rooms of enterprise venue 142. User associated data of users stored in users area 2121 can be limited in some use cases for some users, or nonexistent for some users. For example, a user can enter registration data with defined selections so that user associated data for that user is stored only in allocated memory of a virtual machine of VM Pool instantiated for a patron service session, which data can be guaranteed to be deleted by the deletion of the virtual machine.

Data repository 108 in venues area 2122 can store data on venues of system 100. System 100 can include a plurality of enterprise venues of which enterprise venue 142 is shown. Venues area 2122 can store data on a plurality of enterprise venues, e.g. data on their locations, e.g. in terms of coordinate location ranges for each venue enterprise, data such as room configuration data and data specifying the distribution of IoT sensors.

Data repository 108 in services data area 2123 can store data on hospitality services provided by an enterprise operation enterprise system 110. Hospitality services can include, e.g. restaurant services and so, services data according to one embodiment can include a food menu specifying prepared food items available for consumption to users. Services data area 2123 can also include, e.g. data specifying a electronic media, e.g. television viewing content available to users. Data repository 108 in service data area 2123 can also store data respecting fitness services provided by an enterprise operating enterprise system 110. Data repository 108 in decision data structures area 2124 can store various decision data structures for use by enterprise system 110 in returning data decisions.

Enterprise system 110 can run various process processes including preparation and maintenance process 111, natural language processing (NLP) process 112, registration process 113, geofence process 114, VM instantiation process 115, VM delete process 116, ledger update process 117, ledger access process 118, and machine learning process 119.

Enterprise system 110 running preparation and maintenance process 111 can obtain data from various sources such as client computer devices 130A-130Z, administrator client computer device 135, venue system 140, social media system 160, and geoclassification system 170 can process such data for storage or return data, e.g. structured data into data repository 108 into such areas as users area 2121, venues area 2122, and service data area 2123.

Enterprise system 110 can run NLP process 112 to process data for preparation of records that are stored in data repository 108 and for other purposes. Enterprise system 110 can run a Natural Language Processing (NLP) process 113 for determining one or more NLP output parameter of a message. NLP process 112 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 112 enterprise system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Enterprise system 110 running registration process 113 can register users into system 100. Enterprise system 110 running registration process 113 can, e.g. read registration data defined by users using a user interface displayed on a client computer device. Registration data can include, e.g. name and contact data as well as survey data the specifies preferences of users, e.g. topic preferences, nutritional preferences, fitness preferences, and client controlled preferences, such as temperature and/or lighting preferences. Enterprise system 110 running registration process 113 can include enterprise system 110 sending installation packages to client computer devices 130A-130Z for installation on such client computer devices. Installation packages can include, e.g. libraries and executable code to facilitate functioning of client computer devices, such as client computer devices 130A-130Z, in support of operations of system 100. Data repository 108 in venues area 2122 can store data on the location of enterprise venues as well as data on the layout of such enterprise venues. Enterprise venue location data as well as layout data for such enterprise data can be obtained from geoclassification system 170.

Enterprise system 110 running geofence process 114 can include enterprise system 110 examining location data of a user to determine whether a client computer device associate to a user is currently within a geofence associated to an enterprise venue. Location data of a client computer device and of a user can be provided according to one embodiment, by a client computer device, e.g. a GPS device incorporated into such client computer device. According to one embodiment location data specifying a location of a client computer device can be obtained from a computing node external to a client computer device, provided by a locating service that uses network based locating methodologies, such as cellular or LAN based locating methodologies.

Enterprise system 110 running VM instantiation process 115 can instantiate a transient container for use in providing services to a user for a time period that a user is within a geofence associated to an enterprise venue, such as enterprise venue 142. With container based virtualization isolation between containers can occur at multiple resources, such as at the file system, the network stack system, and one or more name spaces, but not limited thereto. Containers of a container based virtualization system can share the same running kernel and memory space. Container based virtualization technology offers higher performance and less resource footprint when compared to hypervisor based virtualization. Container based VMs herein can be VMs instantiated using DOCKER® container services (DOCKER® is a registered trademark of Docker, Inc. of San Francisco, Calif.).

Enterprise system 110 running VM instantiation process 115 can instantiate a VM for supporting services to user in response to a client computer device of a user breaching a geofence associated to an enterprise venue. According to one embodiment, enterprise system 110 running VM instantiation process 115 can include enterprise system 110 instantiating a container based virtual machine (VM). According to another embodiment, enterprise system 110 running VM instantiation process 115 can include enterprise system 110 instantiating a hypervisor based VM. Enterprise system 110 instantiating a VM can include enterprise system 110 allocating resources to the VM. According to one embodiment, enterprise system 110 allocating resources to the VM being instantiated can include enterprise system 110 limiting allocated memory resources to non-persistent memory resources, e.g. working memory such as random access memory (RAM) memory resources. By limiting memory resources to non-persistent memory resources, stored data stored during a runtime of a VM can be assured of deletion by deletion of the VM.

Enterprise system 110 running VM delete process 116 can delete an instantiated VM, such as a container based VM. Enterprise system 110 can destroy an instantiated VM using an appropriate command, such as "DOCKER_RM" which removes one or more container, "DOCKER_KILL" which can be used to kill a running container, or "DOCKER_CONTAINER_STOP". Enterprise system 110 can be configured so that a VM such as a container based VM or hypervisor based VM is deleted, all data associated and stored within a container such as user associated data of a user is also deleted. In such manner, a user is assured that by deletion of a VM, user associated data of a user is also deleted. Instantiated VMs instantiated by enterprise system 110 define a VM pool 120, which can include a plurality of VMs 122A-122Z, where there is instantiated one VM for each user being provided with location based services by enterprise system 110. Instantiated VMs 122A-122Z can run on computing node(s) 10.

Enterprise system 110 running ledger update process 117 can update ledger 150 to include records provided by blocks of a blockchain of ledger 150 in response to specified transactions occurring. Enterprise system 110 running ledger update process 117 can update ledger 150 when an VM is instantiated. Enterprise system 110 can update running ledger update process 117 can also update ledger 150 in response to an instantiated VM being deleted. Accordingly, ledger 150 can include an immutable ledger record specifying instantiations of VMs which support services to users and the deletion of such VMs. As set forth herein, system 100 can be configured so that personal user data of a VM is automatically deleted with the deletion of a VM. Accordingly, ledger 150 can store an immutable record specifying instances of deletion of user associated data, wherein deletion of user associated data is provided by the deletion of a VM such as a container based VM or hypervisor based VM.

Enterprise system 110 running ledger access process 118 can grant access to ledger 150. Enterprise system 110 according to one embodiment can grant access to users of system 100 to ledger 150 in response to a user registering with system 100. According to one embodiment, users of system 100 can be granted limited permissions with respect to ledger 150, e.g. can be granted viewing rights to ledger 150 but users can be restricted from editing rights to ledger 150. According to one embodiment, editing rights to ledger 150 can be restrictively owned by enterprise system 110.

Enterprise system 110 running machine learning process 119 can train various predictive models for use in returning artificial intelligence (AI) decisions by enterprise system 110. According to one embodiment, enterprise system 110 can train a predictive model which, when trained, is able to predict a user's behavior in dependence on such factors, e.g. on current location and/or prior time period activity classification.

With further reference to enterprise system 110, each VM of VM pool 120 can run various processes, including input process 123, AI process 124, and output process 125. A VM running input process 123 can securely obtain data such as user associated data for input into a VM for processing by a VM without exposure of the data or any processes for processing the data. A VM running AI process 124 can employ AI processes for the processing of data including user associated data of a user to return action decisions. Action decision can include action decisions in relation to services provided to a user in relation to enterprise venue 142, including in relation to food services, entertainment services, fitness services, and/or wakeup services. AI decisions that can be returned by running AI process 124 can include action decisions in relation to environmental conditions of a user when a user is in an environment of enterprise venue 142, e.g. action decision in relation to a temperature of an environment, lighting of an environment, or privacy of an environment. An instantiated VM can include user data area 126 for storing session data including user associated data for support of a patron support session. User data area 126 can be defined by volatile memory of computing node(s) to facilitate deletion of session data including user associated data with deletion of a VM.

Figure 2:
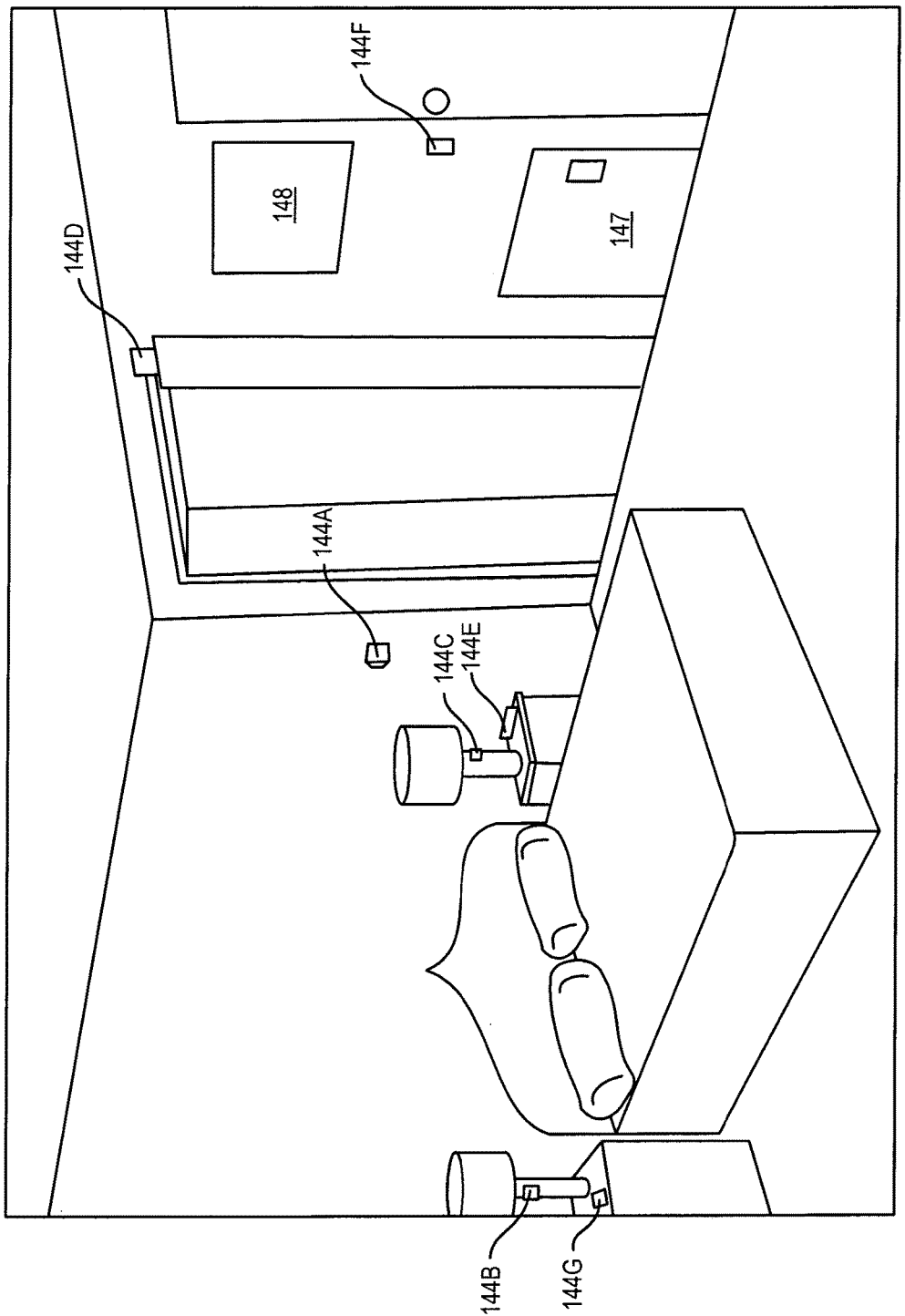
FIG. 2 is a depiction of a portion of an enterprise venue according to one embodiment.

FIG. 2 is a physical form view of a portion of enterprise venue 142 according to one embodiment, e.g. FIG. 2 depicts a room within an enterprise venue provided by a hotel according to one embodiment. Enterprise venue 142 can include a plurality of IoT sensors 144A-144G defining IoT sensor system 144 as depicted in FIG. 1. With reference to FIG. 2, IoT sensor 144A can be a thermostat IoT sensor which senses room temperature, IoT sensor 144B can be an IoT sensor which can sense a lighting level of a first lighting device, IoT sensor 144C can be an IoT sensor that senses a lighting level of a second lighting device, IoT sensor 144D can be an IoT sensor that senses the extent to which a window curtain is shut, IoT sensor 144E can be an IoT sensor that senses a privacy setting associated with a telephone, e.g. whether a telephone has been set to a "do not disturb" setting, IoT sensor 144F can be an IoT sensor that sensors a privacy setting associated with a door, e.g. whether a "do not disturb" sign has been raised, and IoT sensor 144G can be an IoT sensor of an alarm clock with senses a time setting of the alarm clock. Each of the IoT sensors 144A-144G can have associated control data input interface that facilitates the control of an associated device by control data input to the control interface. By input of control data into thermostat IoT sensor 144A a temperature of a room can be changed, by application of control data to a control interface associated to IoT sensors 144B and 144C a lighting level of a room can be changed. By application control data to a control interface associated to IoT sensor device 144D an extent of closure of a window curtain can be changed, by application of control data to a control interface associated to IoT sensor 144E a privacy setting of a telephone can be changed, by application of control data to a control interface associated to IoT sensor 144F a privacy setting associated with a door can be changed, and by application of control data to a control interface associated with IoT sensor 144G a setting of an alarm clock, e.g. a wakeup time can be changed.

Figure 3:
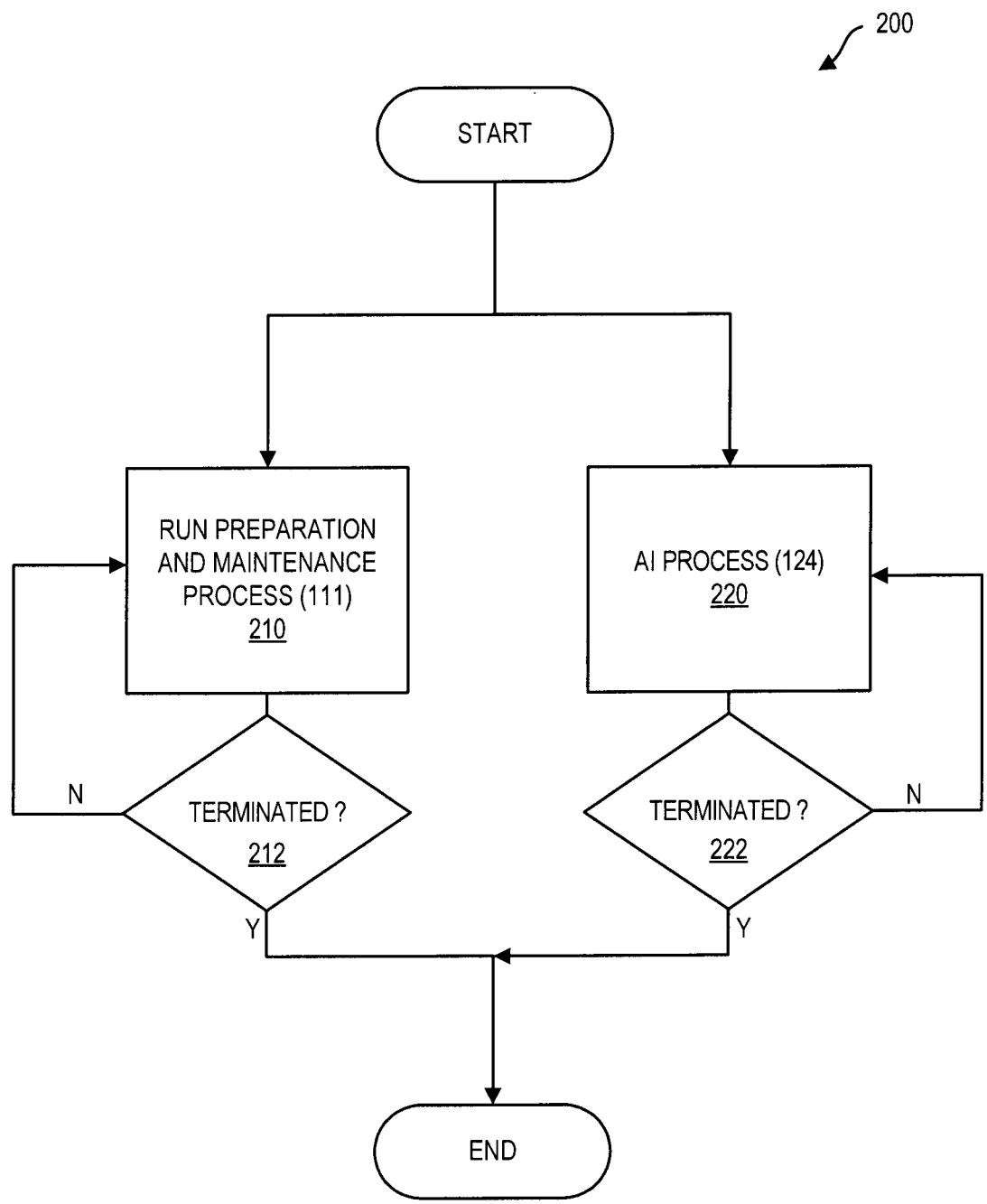
FIG. 3 is a flowchart depicting a method that can be performed by an enterprise system according to one embodiment.

In FIG. 3 there is depicted a flowchart illustrating performance of method 200 that can be performed by enterprise system 110 of FIG. 1, in accordance with one or more embodiments set forth herein.

At block 210, enterprise system 110 can run preparation and maintenance process 111 to populate prepare and maintain various data of data repository 108 including data of locations areas 2121-2124. Enterprise system 110 can run preparation and maintenance process 111 iteratively until preparation and maintenance process 111 is terminated at block 212.

At block 220, enterprise system 110 can run VM instantiation process 115. For support of running of VM instantiation process 115 iteratively, enterprise system 110 can be running e.g. processes 112-114 and other processes iteratively. Enterprise system 110 can run VM instantiation process 115 e.g. for support of service sessions for multiple different users until process 115 is terminated at block 222. Enterprise system 110 can run preparation and maintenance process 111 and VM instantiation process 115 concurrently and can run each of preparation and maintenance process 111 and process 115 iteratively.

Figure 4A:
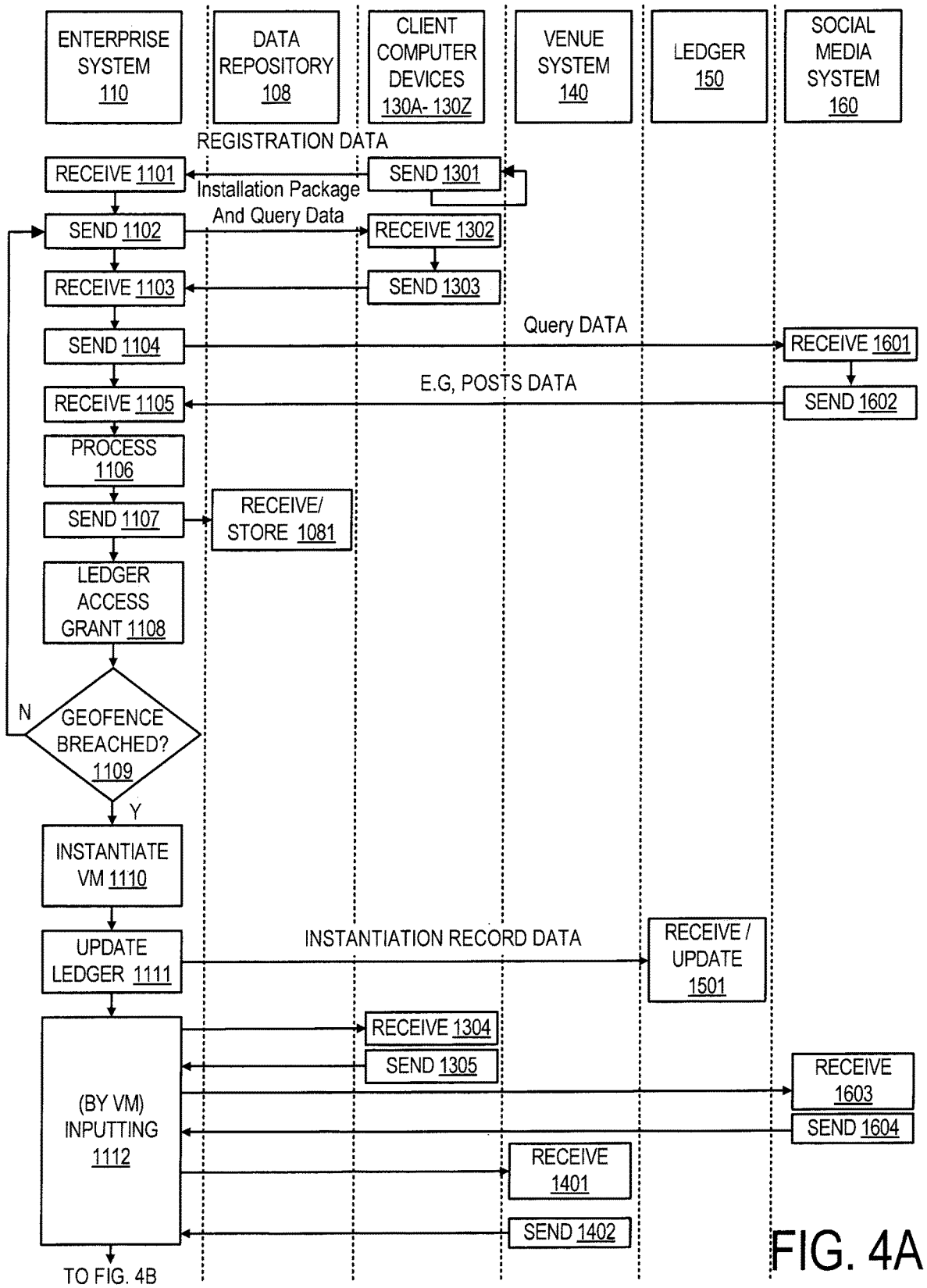
FIGS. 4A-4B is a flowchart depicting operations of an enterprise system interoperating with client computer devices, a venue system, a ledger, and a social media system according to one embodiment.
Figure 4B:
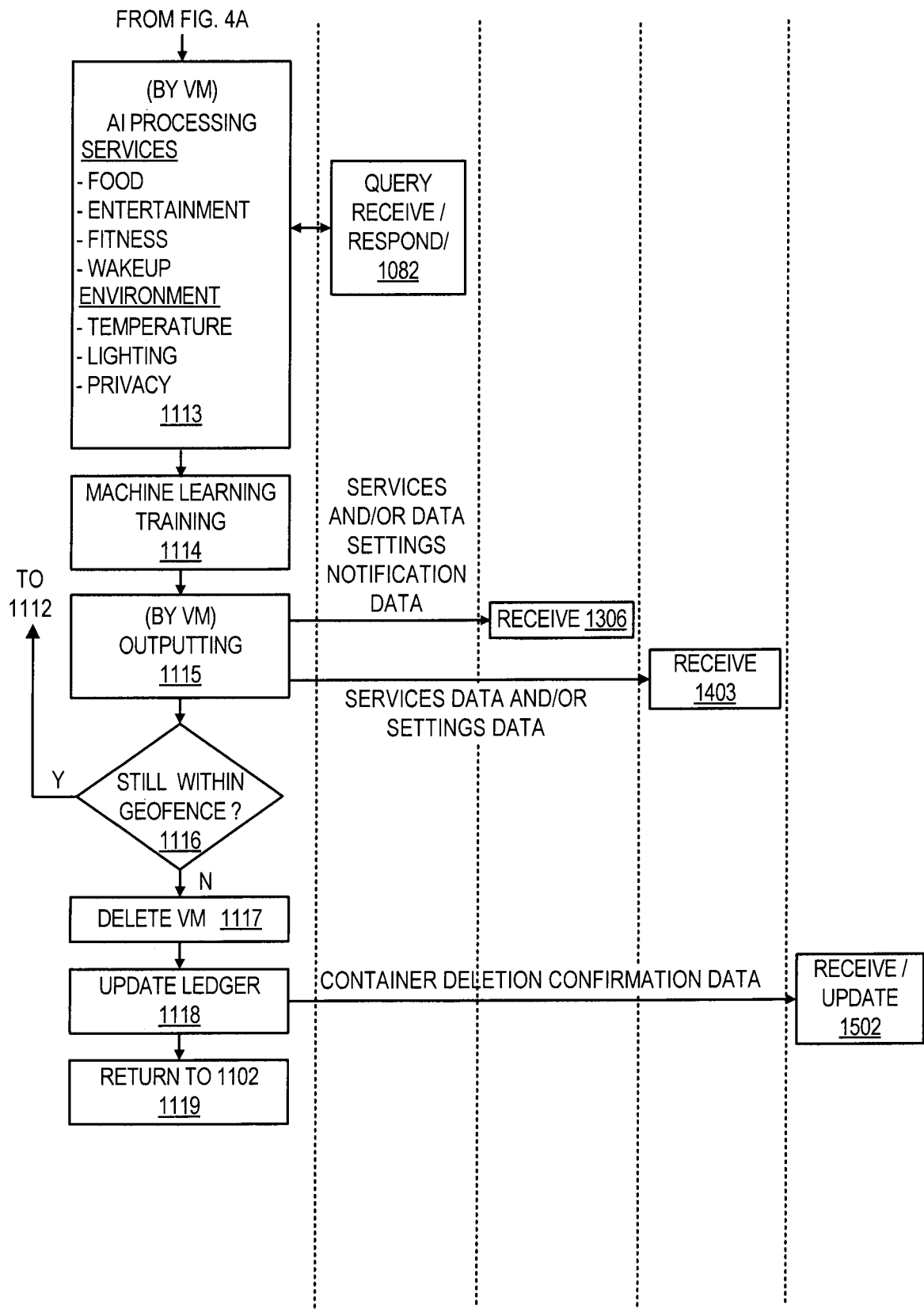

The flowchart of FIGS. 4A-4B depicts a method for performance by enterprise system 110 interoperating with client computer devices 130A-130Z, venue system 140, ledger 150, and social media system 160. At block 1301 client computer devices 130A-130Z can be iteratively sending registration data to enterprise system 110 for receipt by enterprise system 110 at block 1101. Users can define and send registration data using a user interface 5000 as set forth in FIG. 5.

Figure 5:
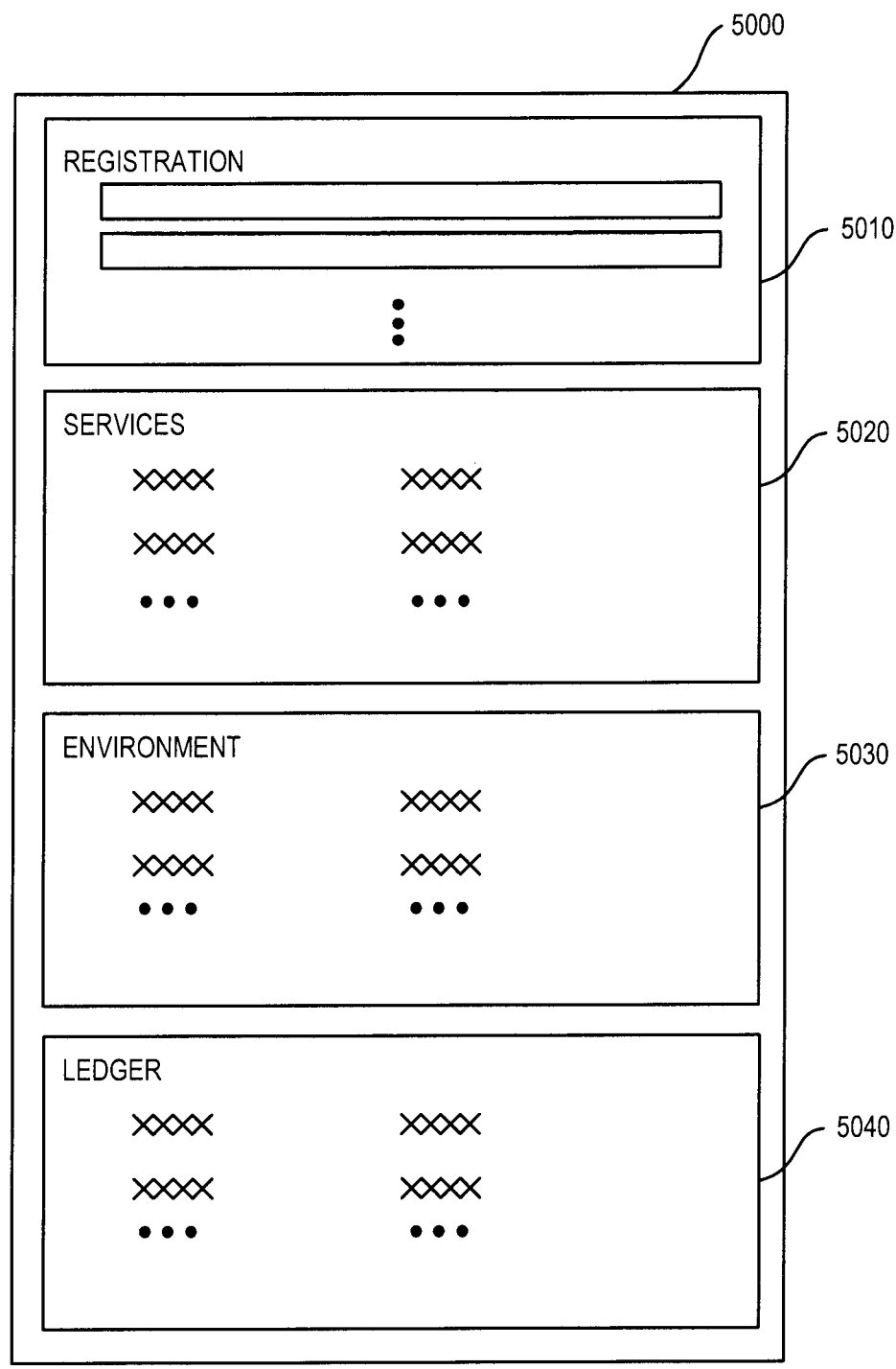
FIG. 5 depicts a displayed user interface that can be displayed on a client computer device according to one embodiment.

User interface 5000 as shown in FIG. 5 can include registration area 5010 that allows the user to enter registration data, e.g. name and contact information, social media account information, and the like. In area 5010 the user can also fill out survey data that specifies preferences of users, e.g. in terms of food preferences, entertainment preferences, fitness preferences, wakeup schedule preferences, and environment condition preferences such as room temperature preferences, lighting preferences, and privacy preferences. In response to receipt of registration data at block 1101 enterprise system 110 can proceed to block 1102.

At block 1102 enterprise system 110 can send installation package and query data to client computer devices 130A-130Z for receipt by client computer devices 130A-130Z at block 1302. In response to receipt of an installation package a receiving client computer device can install the installation package. An installation package can include, e.g. libraries and executable code facilitating functions of client computer devices in accordance with services provided by system 100. Functions to facilitate participation of a client computer device in system 100 can include such functions as functions that allow secure extraction of user associated data supporting applications running on a client computer device such as a nutrition assistance application or a fitness application. In response to receipt of an installation package at block 1302 a client computer device can install the installation package, in response to receipt of query data at block 1302 a client computer device can respond to the query data, and at block 1303 can responsively send data stored on a client computer device for receipt by enterprise system 110 at block 1103. Sent data sent at block 1303 can include user associated data provided by location data specifying a location of a client computer device of a user and other user associated data, e.g. data of a nutrition application and/or a fitness application running on a client computer device. In response to receipt of data at block 1103, enterprise system 110 can proceed to block 1104. With use of user interface 5000 (FIG. 5) a user can define registration data (sent at block 1301) that restricts client computer devices 130A-130Z from sending user associated data at block 1303.

At block 1104 enterprise system 110 can send query data to social media system 160 for receipt by social media system 160 at block 1601. Data sent by enterprise system 110 at block 1104 can include query data to query social media system 160 for return of data respecting a user who has registered into system 100 by sending registration data at block 1601. In response to receipt of query data at block 1301 social media system 160 at block 1602 can responsively send data for receipt by enterprise system 110 at block 1105. Data sent at block 1602 can include, e.g. user associated data provided by posts data specifying post content by users of system 100 who have initiated registration by sending of registration by sending of registration data at block 1301. Posts data can include, e.g. social media posts initiated by a user and/or interacted with by a user, e.g. by presentment of comments, likes, and/or views. Posts data can include, e.g. text based data and/or spatial image based data. In response to receipt of posts data of data at block 1105, enterprise system 110 can proceed to block 1106. With use of user interface 5000 (FIG. 5) a user can define registration data (sent at block 1301) that restricts social media system 160 from sending user associated data e.g. as defined by posts data at block 1602.

At block 1106 enterprise system 110 can process received data received at block 1103 and 1105 to return profile data of users. Processing of data at block 1106 can include activation of NLP process 112 to, e.g. segment and return topics associated to received registration data and/or received social media data such as posts data. Returned profile data returned by performance of processing at block 1106 can be sent by enterprise system 110 at block 1107 for receipt by data repository 108 at block 1081.

At block 1081 data repository 108 can store received profile data into users area 2121 of data repository 108. Profile data can include data specifying preferences of users, e.g. in terms of food preferences, entertainment preferences, fitness preferences, wakeup schedule preferences, and environmental condition preferences such as room temperature preferences, lighting preferences, and privacy preferences. It will be seen that preference data can be returned by examination of registration data, by examination of user associated data obtained from a client computer device and/or by examination of user associated data provided by social media data. For return of data on food preferences for example, enterprise system 110 can examine user associated data provided by social media system posts data that specifies that a user dined at a certain restaurant with a certain type of food and liked a certain type of food. For return of entertainment data, enterprise system 110 can examine posts data specifying that a user attended a certain movie and like it or disliked it. Enterprise system 110 in addition to examining registration data can examine, e.g. user associated data of a fitness application running on a client computer device and/or posts data indicating that a user liked or disliked a certain workout. For return of preference data regarding a wakeup schedule, enterprise system 110 can, e.g. examine data of registration data, application data, e.g. a fitness application which records a wake time and sleep time of a user, and/or posts data indicating times at which a user began to record online activity. Temperature, lighting, and privacy preferences of a user can also be returned by examination of registration data, user associated data of a client computer device, and/or user associated data provided by posts data of social media system 160, e.g. posts data indicating that certain temperature, lighting, or privacy conditions are preferred. Enterprise system 110 in response to completion of block 1107 can proceed to block 1108.

At block 1108 enterprise system 110 can grant access to registered users rights in ledger 150. At block 1108 enterprise system 110 can grant limited rights to registered users of system 100 in relation to ledger 150. According to one embodiment rights of registered users of system 100 in ledger 150 can be limited to view rights so that registered users can view ledger 150 to determine service sessions mediated by enterprise system 110 and to view confirmation receipt confirming deletions of user associated data by enterprise system 110.

Referring again to FIG. 5, a user can view updates to ledger 150 by viewing ledger area 5040 of user interface 5000 which can be a displayed user interface which can be displayed on a display of a client computer devices of client computer devices 130A-130Z. On completion of block 1108 enterprise system 110 can proceed to block 1109 to determine whether a geofence associated to enterprise venue 142 has been breached.

Enterprise system 110 can determine a geofence associated to an enterprise venue 142 by lookup of spatial coordinate data from geoclassification system 170. A geofence associated to enterprise venue 142 can coincide precisely with a spatial border of an enterprise venue 142 or can be established as a perimeter spaced from an encompassing spatial border of an enterprise venue. In response to determination at block 1109 that a geofence has not been breached, enterprise system 110 can return to block 1102 to iteratively perform blocks 1102-1108.

Iteratively performing block 1103 enterprise system 110 can obtain updated location data of client computer devices 130A-130Z, and at block 1109 obtained updated client computer device location data can be examined in connection with geofence data to determine whether a geofence has been breached. In response to a geofence breach condition being established, enterprise system 110 can proceed to block 1110 to instantiate a VM associated to a client computer device breaching a geofence, the geofence breach being determined at block 1109.

Enterprise system 110 performing instantiate block 1110 can include enterprise system 110 activating VM instantiation process 115 set forth in reference to FIG. 1. At block 1110 enterprise system 110 can instantiate, e.g. a container based VM for a breaching user or a hypervisor based VM for a breaching user. In the case of a container based VM instantiation enterprise system 110 at block 1110 can use a "DOCKER_CONTAINER_CREATE" command to instantiate a new container, for support services to a breaching user of an associated client computer device determined to have breached a geofence at block 1109. Enterprise system 110 in response to completion of block 1110 can proceed to block 1111.

At block 1111 enterprise system 110 can update ledger 150. At block 1111, enterprise system 110 can update ledger 150 with a new block to record the new transaction defined by the instantiation of a VM at block 1111. Updating ledger at block 1111 can include sending of instantiation record data for receipt by ledger 150 at block 1501. In response to the receipt of instantiation record data received by ledger 150 at block 1501, ledger 150 can update ledger 150 to include a record of the new transaction defined by the instantiation of a new VM at block 1110. In response to completion of block 1111 enterprise system 110 can proceed to block 1112 to perform secure inputting data, including user associated data into the VM instantiated at block 1110.

Enterprise system 110 performing inputting at block 1112 can include a VM, e.g. VM 122A activating input process 123. Inputting by an instantiated VM at block 1112 can include the instantiated VM sending query data for receipt by the breaching client computer device at block 1304, receiving returned data from the breaching client computer device (responsively sent by a client computer device at block 1305), sending query data for receipt by social media system 160 for receipt by social media system 160 at block 1603, and receiving from social media system 160 returned data (responsively sent by social media system 160 at block 1604), sending query data for receipt by venue system 140 for receipt by venue system 140 at block 1401, and receiving from venue system 140 returned venue system data (responsively sent by the venue system at block 1402). Received data received by the instantiated VM at block 1112 for secure input into the instantiated VM at block 1112 can include from a breaching client computer device user associated data, e.g. user associated data from applications running on the breaching client computer device such as user associated data provided by nutrition application user associated data and fitness application user associated data and output data of one or more biometric sensor e.g. a body temperature sensor and/or a pulmonary sensor (e.g. which can be disposed in a client computer device provided by a smartwatch according to one embodiment). Received data received by the instantiated VM at block 1112 for secure input into the instantiated VM at block 1112 can include user associated data from social media system 160 of the social media account of a user associated to a breaching client computer device. Social media system user associated data can include e.g. posts data. Received data received by the instantiated VM at block 1112 from venue system 140 can include data specifying settings of IoT sensors 144A-144G of IoT sensor system 144 as depicted in connection with FIG. 2. The instantiated VM instantiated by enterprise system 110 at block 1110 on completion of block 1112 can proceed to block 1113, wherein the instantiated VM performs AI processing. AI processing performed by an instantiated VM at block 1113 can include the instantiated VM activating AI process 124 as described in connection with FIG. 1.

User associated data received by enterprise system 110 (received by an instantiated VM) for at block 1112 from a client computer device and social media system 160 can be differentiated from user associated data received by enterprise system 110 from a client computer device and social media system 160 at blocks 1103 and 1105. The differentiation can be based on registration data defined by a user using user interface 5000 (FIG. 5). A user made aware of the secure VM data deletion feature herein (wherein an instantiated VM stores data including user associated data in a volatile memory for deletion by deletion of the VM) may designate an expanded set of user associated data for receipt at block 1112 (by an instantiated VM) than at block 1103 and 1105, wherein data of the expanded set of user associated data is not received at block 1103 or block 1105. The expanded set of user associated data can include e.g. biometric sensor output data (e.g. body temperature sensor, pulmonary, e.g. pulse or heartrate sensor). The expanded set of user associated data can include e.g. application data from an application running on a client computer device such as personal calendar application data, nutrition application data and/or fitness application data. The expanded set of user associated data can include e.g. posts data of user stored in social media system 160. According to one use case a user can enter a selection so that no user associated data other than location data of user (as specified by a location of a client computer device associated to a user) is received at block 1103 or 1105 but is received at block 1112 (by a VM).

At block 1113 the instantiated VM can perform AI processing to return action decisions in relation to services and environment conditions being presented to a user such as a user physically present within enterprise venue 142. Services related to action decisions can include, e.g. action decisions to present a user with food or food options, entertainment or entertainment options, fitness options, wakeup service options, and can also include action decisions to customize environment conditions for a certain user, e.g. by the presentment of control data to control one or more of a temperature, lighting, or privacy within a user's environment within an enterprise venue 142, e.g. within a room of an enterprise venue 142 as depicted in FIG. 2.

An instantiated VM performing AI processing at block 1113 can include an instantiated VM performing predicting as to a services or environment selection of a user in dependence on preference data established for the user as set forth herein. An instantiated VM can employ a decision data structure for use in return of action decisions in dependence on predictions as to selections based on preference data. It will be seen that preference data can be returned at block 1113 by examination of registration by examination data including user associated data received by the instantiated VM of enterprise system 110 at block 1112. Preference data can be returned by the instantiated VM at block 1113 e.g. by examination of user associated data obtained from a client computer device and/or by examination of user associated data provided by social media data. For return of data on food preferences for example, enterprise system 110 can examine user associated data provided by social media system posts data that specifies that a user dined at a certain restaurant with a certain type of food and liked a certain type of food. For return of entertainment data, enterprise system 110 can examine posts data specifying that a user attended a certain movie and like it or disliked it. Enterprise system 110 can examine, e.g. user associated data of a fitness application running on a client computer device and/or posts data indicating that a user liked or disliked a certain workout. For return of preference data regarding a wakeup schedule, enterprise system 110 can, e.g. examine user associated data provided by application data, e.g. a fitness application running on a user's client computer device which records a wake time and sleep time of a user, and/or posts data indicating times at which a user began to record online activity. Temperature, lighting, and privacy preferences of a user can also be returned by examination of user associated data of a client computer device (e.g. application data and or biometric sensor output data) and/or user associated data provided by posts data of social media system 160, e.g. posts data indicating that certain temperature, lighting, or privacy conditions are preferred.

Table A as set forth herein includes a decision data structure, wherein user selections for lighting are predicted to be in accordance with determined lighting preferences of a user, e.g. as set forth herein which may be determined by examination of registration data, client computer device stored user associated data, and/or social media system stored user associated data, e.g. provided by posts data of a user.

TABLE A

| Preference Data | Action Decision |
| --- | --- |
| Bright | Nightstand lights on high, overhead lights on high |
| Medium | Nightstand light on medium, overhead lights off |
| Dim | Overhead light off, nightstand light on, second nightstand light off, curtains auto drawn closed |

An instantiated VM can return lighting preference data using user associated data of a user in multiple ways. For example, an instantiated VM can return preference using biometric sensor output data, e.g. can return a lighting preference that is inversely proportional to body temperature (with lower body temperature a brighter light preference may be assigned and with a higher body temperature a dimmer lighting preference can be assigned) or heart rate (with lower heart rate a brighter light preference may be assigned and with higher heart rate a dimmer lighting preference can be assigned). The instantiated VM can examine social media posts data, e.g. including by activation of NLP process 112 to return topics from posts content in regard to lighting preferences. An instantiated VM can also return lighting preference data using application data of an application running on a user's client computer device, e.g. can examine user associated data provided by calendar data of a calendar application running on a client computer device, e.g. can determine that a user just completed a long distance flight between time zones, and based on such determination can classify the current lighting preference of the user as "dim".

The decision data structure of Table A cognitively maps preferences of the user to lighting control action decisions associated to the preferences, wherein the action decisions are customized in accordance with a particular lighting scheme existing in a particular enterprise venue. It will be understood that different decision data structures can be determined for different room configurations and/or enterprise venues, e.g. can be differentiated in dependence on the type of lighting present in a venue, the number of lights, dimming options for the lights, and the like.

Table B as set forth herein includes a decision data structure, wherein user selections for lighting are predicted to be in accordance with determined room temperature preferences of a user, e.g. as set forth herein which may be determined by examination of registration data, client computer device stored user associated data, and/or social media system stored user associated data, e.g. provided by posts data of a user. An instantiated VM can return room temperature preference data using user associated data of a user in multiple ways. For example, an instantiated VM can return preference using biometric sensor output data output by a biometric sensor incorporated in a client computer device, e.g. can return a room temperature preference that is inversely proportional to body temperature (with lower body temperature a warmer room temperature preference may be assigned and with a higher body temperature a cooler room temperature preference can be assigned) or heart rate (with lower heart rate a warmer room temperature preference may be assigned and with higher heart rate a cooler room temperature preference can be assigned). The instantiated VM can examine social media posts data, e.g. including by activation of NLP process 112 to return topics from posts content in regard to room temperature preferences (e.g. can process posts with such text content as "I'm always freezing" or the like to return room temperature preference data).

TABLE B

| Preference Data | Action Decision |
| --- | --- |
| Cool | Set room temperature to 63 deg. F |
| Medium | Set room temperature to 70 deg. F |
| Hot | Set room temperature to 77 deg. G |

The decision data structure of Table B cognitively maps preferences of the user to room temperature control action decisions associated to the preferences, wherein the action decisions are customized in accordance with a particular temperature control scheme existing in a particular enterprise venue. It will be understood that different decision data structures can be determined for different room configurations and/or enterprise venues, e.g. can be differentiated in dependence on the type of temperature control system in an enterprise venue.

Table C illustrates a decision data structure that cognitively maps food item preference data to action decisions in dependence on the preference data.

TABLE C

| Preference Data | Action Decision |
| --- | --- |
| Fish/Poultry | Auto-Dispense A |
| Meat | Auto-Dispense B |
| Vegetarian | Auto-Dispense C |

Users having a preference data classification of "fish/poultry" can be auto-served, e.g. through automated food vending machine 147 food item A, users having a preference data with a classification of "beef" can be auto-served through automated food vending machine 147 food item B, and users having food preference data classification of "vegetarian" can be auto-served through automated food vending machine 147 food item C. The action decisions Table B can alternatively express as food menu option selections available for order to a user, e.g. can be expressed as displayed text messages displayed in area 5020 of user interface 5000 shown in FIG. 5. An instantiated VM can return food item temperature preference data using user associated data of a user in multiple ways. According to one embodiment, an instantiated V can examine obtained data from a nutrition application running on a client computer device and based on the determination that the user is nearing a caloric limit target for the current day can assign food item preference data according to the food item having the lowest caloric count.

The decision data structure of Table D cognitively maps entertainment preference data to action decisions in dependence on the preference data.

TABLE D

| Preference Data | Action Decision |
| --- | --- |
| Comedy | Auto-play A |
| Drama | Auto-play B |
| Documentary | Auto-play C |

Users classified as having an entertainment preference for "comedy" can be subject to an auto-play on display screen 148 (FIG. 2) movie selection A, users classified as having an entertainment preference for "drama" can be subject to an auto-play on display screen 148 movie selection B, and users classified as having an entertainment preference for "documentary" can be subject to an auto-play on display screen 148 movie selection C. Of course, the action decisions can alternatively be expressed as text based menu options selectable by a user, e.g. a text based menu option displayed in area 5020 of user interface 5000 so that a user can select entertainment content amongst a set of menu options that match a classification according to preference data of the user. An instantiated VM can return entertainment preference data using user associated data of a user in multiple ways. According to one embodiment, an instantiated VM can obtain user associated data from a client computer device provided by web browsing history data and can subject websites searched to processing by activation of NLP process 112 to return topics associated to a user's searched websites. The instantiated VM can examine social media posts data, e.g. including by activation of NLP process 112 to return topics from posts content in regard to entertainment preferences (e.g. can process posts with such text content as "I never laughed so loud at a movie theater before" to return entertainment topic preferences).

The decision data structure of Table E cognitively maps privacy preference data to action decisions in dependence on the preference data.

TABLE E

| Preference Data | Action Decision |
| --- | --- |
| Low Privacy | Open to all phone calls, room visits |
| Medium Privacy | Open to phone calls, "do not disturb" sign electronically displayed on door display |
| High Privacy | All phone calls blocked, "do not disturb" sign electronically displayed on door display |

Users classified as having a low privacy preference, can be open to phone calls and room visits, users classified as having a medium privacy preference can be open to phone calls but not room visits, and users classified as having a privacy preference can be accommodated by enterprise system 110 blocking phone calls via appropriate control of telephone IOT device 144E (FIG. 2) and activating doorway IOT device 144F (FIG. 2) to electronically display a "do not disturb" sign viewable from an exterior of the depicted room. An instantiated VM can return lighting preference data using user associated data received ad block 112 e.g. provided by application data of an application running on a user's client computer device, e.g. can examine user associated data provided by calendar data of a calendar application running on a client computer device, e.g. can determine that a user just completed a long distance flight between time zones, and based on such determination can classify the current privacy preference of the user as "high privacy" in anticipation that the user will be wanting rest without disturbances.

Figure 6:
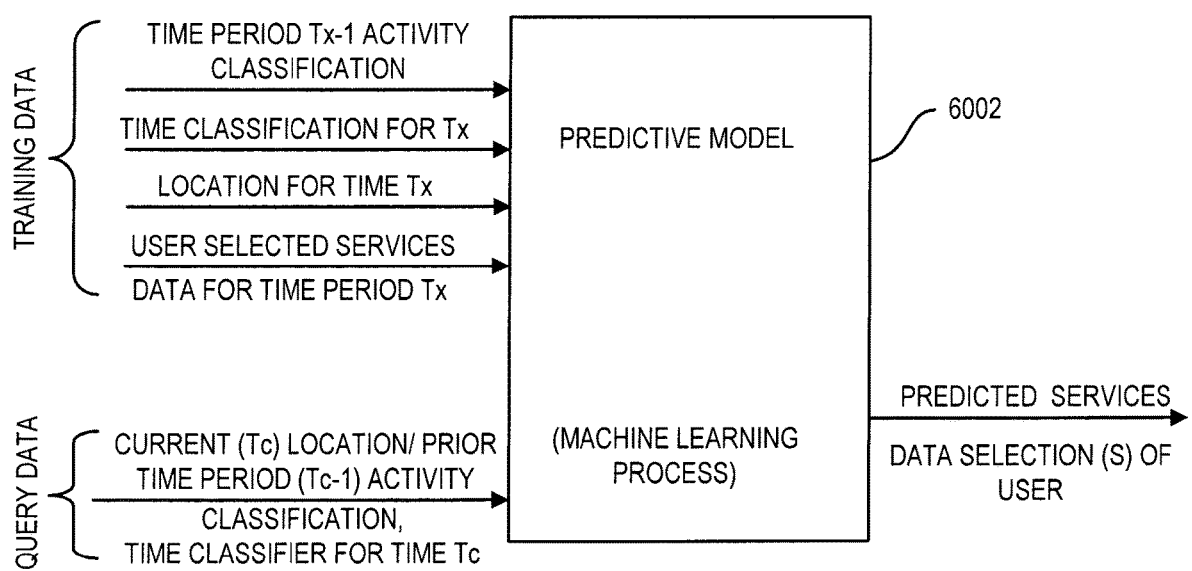
FIG. 6 depicts a predictive model that can be trained by supervised machine learning processes according to one embodiment.

For return of services action decisions enterprise system 110 by an instantiated VM can, in addition to or in place of use of decision data structures, query predictive model 6002 as depicted in FIG. 6 which has been trained by machine learning processes. Predictive model 6002 for use in returning services related action decisions can be iteratively trained using training data by machine learning processes including supervised machine learning processes. Services training data can include a data set which comprises data for a succession of time periods, e.g. time period TX, where X increases from 0-N. Predictive model 6002 as depicted in FIG. 6 can be particularly trained to output predictions in dependence on a current location of a user, e.g. the particular hotel or restaurant and an activity classification of the user during a recent time period, e.g. which can be the time period of a prior day and can pertain, e.g. to whether a user had a "traveling" activity classification, a "working" activity classification, or "recreational" activity classification. The activity classifications can be ascertained by performance of processing at block 1106 using, e.g. data from a client computer device fitness application which logs instances of sitting, running, and walking of a user with data items geostamped to specify a location of an activity.

Enterprise system 110 can instantiate an instance of predictive model 6002 for a specific user for each of several services such as food services, entertainment services, fitness services, or wakeup services. For each time period TX of a succession of time periods for which training data is input there can be applied as training data to predictive model 6002 a time classification parameter value, e.g. morning, afternoon, or night, a location for the time period, and user selected services data for the time period, e.g. what selections a user manually initiated in relation to a particular service, e.g. food related, entertainment related, fitness related, or wakeup service related. There can also be input as training data for each iteratively applied training data set an activity classification for the user during a most recent time period TX-1.

Embodiments herein recognize that a user's behavior may change in dependence on a recent activity of a user, e.g. whether a prior day was a travel day, a work day, or a recreation day. Predictive model 6002 once trained, is able to predict services data selection(s) of a user in response to applied query data applied to predictive model 6002 once trained. Query data applied to predictive model 6002 can comprise a dataset, wherein the dataset includes a current, e.g. at time TC, location of a user, a prior time period (TC-1) activity classification of a user, and a time classifier for the current time TC, e.g. morning, afternoon, night, or another appropriate segmentation scheme for dividing a day into different time periods.

In response to applied query data predictive model 6002 can return predictive services data selection(s) of a user, e.g. for food services can predict that a user will select a particular set of food items, for entertainment services can predict that a user will select a particular type of electronic content presentment for entertainment, e.g. a movie of a particular genre, for fitness services can predict that a user will select a particular type of fitness workout, and can predict in relation to wakeup services that a user will select a certain time setting for an alarm clock.

Figure 7:
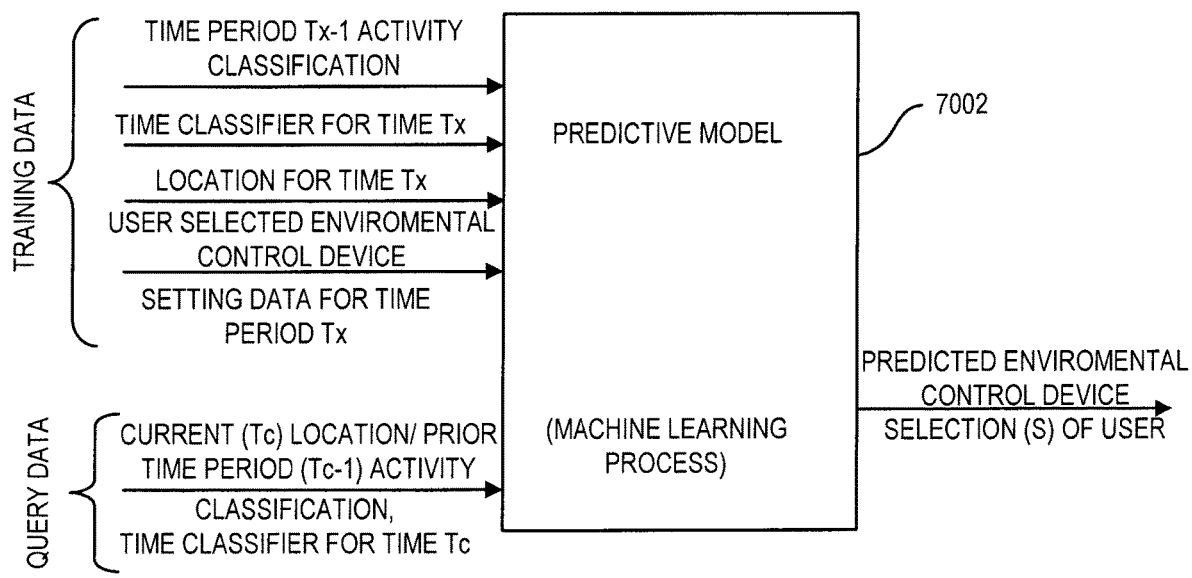
FIG. 7 depicts a predictive model that can be trained by supervised machine learning processes according to one embodiment.

Predictive model 7002 as shown in FIG. 7 can predict manual settings for environmental condition control devices after predictive model 7002 is trained by supervised machine learning processes using iterations of training data. Predictive model 7002 as depicted in FIG. 7 can be iteratively trained using training data. A dataset for use in training predictive model 7002 during a training iteration can comprise data for a certain time period, such as a time classifier for the time period, e.g. morning, afternoon, or night, a location for the user during the particular time period, e.g. the location of a particular hotel, and user selected environmental control device setting data for the user for the particular time period. There can be included with an iteration of training data for training of predictive model 7002, an activity classification for the user, e.g. a classification option "travelling", "working", or "recreating" during a prior time period TX-1. By application of the described training data predictive model 7002 is able to learn a user's behavior in dependence on a user's prior manual selections of an environmental control device at a particular location, a particular time of day, and in dependence on a user's prior activity.

Enterprise system 110 can instantiate an instance of predictive model 7002 for a particular user for each of several environmental control devices, e.g. a first predictive model for use in predicting manual selections of a user in relation to a temperature environmental control device, e.g. a thermostat, a second predictive model for use in predicting manual selections of a user in relation to one or more lighting control device, e.g. a control device to control lighting by a lighting device or a window curtain device, and a third predictive model for use in predicting manual selections of a user in relation to one or more privacy control device, e.g. a control device to control a privacy setting of a doorway or a telephone.

Predictive model 7002, once trained, is able to respond to query data. Applied query data applied to predictive model 7002 can comprise a dataset, wherein the dataset includes a location of a user at a current time, time TC, a prior time period (TC-1), activity classification of the user, and a time classifier for a current time (TC), e.g. morning, afternoon, or night time classifier. In response to the applied query data, predictive model 7002 can return predicted environmental control device selections (S) of a user.

An instantiated VM performing AI processing at block 1113 can include the instantiated VM querying instances of predictive model 6002 and predictive model 7002 for return of predictions specifying predicted manual services selections of a user and manual environmental control settings of a user, e.g. in terms of temperature, lighting, and privacy settings. The instantiated VM performing AI processing at block 1113 can return action decisions to implement actions in accordance with the predicted manual selections of a user returned by application of query data to predictive model 6002 and predictive model 7002. In response to completion of block 1113 the instantiated VM can proceed to block 1115 to perform outputting.

The instantiated VM performing outputting at block 1115 can include the instantiated VM performing output process 125 as depicted in FIG. 1. The instantiated VM performing outputting at block 1115 can include the instantiated VM providing one or more output to implement an action decision returned at AI processing block 1113.

Predictive models 6002 and 7002 can be iteratively trained using historical data stored in data repository 108 such as users area 2121, venues area 2122, and services data area 2123 (FIG. 1). Data repository 108 can be iteratively updated, e.g. by the performance of block 1107 and block 1081 as set forth herein. One or more output provided by an instantiated VM at block 1115 can include sending of services data and/or settings notification data for receipt by a breaching client computer device at block 1306 and/or can include the sending of services data and/or settings data for receipt by venue system 140 at block 1403. Received services data received by a breaching client computer device at block 1306 can result in a displayed text based notification on user interface 5000 displayed on a display of a breaching client computer device.

Training data for training predictive models 6002 and 7002 can according to one embodiment be absent of user associated data obtained from a user's client computer device or social media account of social media system 160. For example, according to one embodiment, training data can consist exclusively of data generated by computing nodes of enterprise venue 142 based on user interactions with such computing nodes (e.g. menu and/or settings selections of users). Accordingly, predictions can be made as to user selections without use of user associated data obtained from a client computer device and/or social media system 160.

Referring to FIG. 5, services area 5020 of user interface 5000 can include text based data that specifies services provided to a user. For example, in area 5020 there can be displayed text based data specifying food item options for a user, entertainment options customized for a user, fitness options for a user, and/or wakeup service options for a user. In area 5030 of user interface 5000 (FIG. 5) there can be displayed text based data specifying environmental control device settings that have been implemented automatically by enterprise system 110, based on predicted manual settings of a user. Area 5030 can specify environment condition control device settings such as temperature settings, lighting settings, and privacy settings. Services data and/or settings data received by venue system 142 can result in control of one or more device within enterprise venue 142.

An action decision to automatically set a temperature in dependence on a predicted manual setting (predicted e.g. using a decision data structure according to Tables A-E and/or a predictive model 6002 and/or 7002) can result in thermostat 144A as shown in FIG. 2 being controlled to set a room temperature to a predicted manually set temperature of a user. Control data can be applied to IoT lighting control devices 144B, 144C, and 144D so that a predicted lighting selection (predicted e.g. using a decision data structure according to Tables A-E and/or a predictive model 6002 and/or 7002) is automatically implemented, and control data defined by the data received at block 1403 can result in privacy control IoT devices 144E and 144F for a telephone and a doorway respectively being activated for privacy (e.g. blocking phone calls and activating the doorway IOT device to electronically display a "do not disturb" sign) according to a predicted privacy selection (predicted e.g. using a decision data structure according to Tables A-E and/or a predictive model 6002 and/or 7002). Received data received at block 1403 can include control data to set IoT device 144G for an alarm clock so that an alarm clock is set in accordance with a predicted manual selection of a user (predicted e.g. using a decision data structure according to Tables A-E and/or a predictive model 6002 and/or 7002).

Services data received at block 1403 defining control data can control a food delivery device. For example, in room food vending machine 147 as depicted in FIG. 2, in dependence on a predicted food item manual selection of a user, food vending machine 147 as shown in FIG. 2, can automatically dispense a food item in accordance with a predicted food item manual selection of a user predicted at block 1113. Services data defining control data received at block 1403 can automatically control electronic display screen 148 (FIG. 2) to display an entertainment selection in accordance with the predicted manual entertainment selection predicted at block 1113 (predicted e.g. using a decision data structure according to Tables A-E and/or a predictive model 6002 and/or 7002).

At block 1112 an instantiated VM instantiated at block 1110 can be securely receiving data from a breaching client computer device as well as from venue system 140. Received data received from venue system 140 can include settings data of users, e.g. users within enterprise venue 142 making manual selections in regard to services and/or environment climate control devices which may override prior automated settings implemented by enterprise system 110. Received data from a breaching client computer device can include, e.g. user associated data from applications running on the client computer device and location data. Based on obtained data obtained from a client computer device and/or venue system 140, enterprise system 110 can iteratively train predictive models 6002 and 7002, wherein a new iteration of training data is applied based on most recently obtained data obtained during from a client computer device and/or venue system 140 during a most recent instance of inputting block 1112. By performing machine learning training iteratively at block 1114 predictive models 6002 and 7002 can be updated so that they are capable of performing predictions based on most recent behaviors of the user.

Embodiments herein recognize that AI processing performed by an instantiated VM at block 1113 can include use of AI processes in addition to or alternatively to use of predictive models 6002, and 7002 as set forth herein.

An instantiated VM at block 1113 can perform AI processing using a function based on multiple factors, wherein a first factor is a predicted setting of a user using based on preference data of a user (e.g. using a decision data structure as described in connection with Tables A-D) and a second factor is a predicted setting of a user based on return data returned by querying of predictive model 6002 or predictive model 7002. Weights can be associated to the first and second factors with predicted actions being biased over time more in favor of a prediction returned with use of a predictive model, as the size of an employed data corpus of historical data within data repository 108 grows and a confidence level associated to return data returned with uses of a predictive model increases.

Various available tools, libraries, and/or services can be utilized for implementation of predictive model 6002 and predictive model 7002. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models.

Performance of outputting block 1115 by an instantiated VM can include an instantiated VM activating output process 125 as set forth in FIG. 1.

In response to completion of outputting block 1115 by an instantiated VM, enterprise system 110 can proceed to block 1116. At block 1116, enterprise system 110 can determine whether a breaching client computer device remains within an established geofence associated to enterprise venue 142. In response to a determination that a client computer device is still within a geofence associated to enterprise venue 142 enterprise system 110 can return to block 1112, wherein the instantiated VM instantiated at block 1110 performs a next iteration of secure data input as explained with reference to blocks 1112, 1304, 1305, 1401, and 1402. Referring to block 1116 it is seen that return of user preference data, e.g. lighting preference data, room temperature preference data, food preference data, entertainment preference data, privacy preference data can be performed by an instantiated VM on an iterative basis using data including user associated data received by the instantiated VM at block 1112. Accordingly, embodiments herein recognize that returned preference data across classifications of preference data can iteratively change during a patron service support session wherein a patron user associated to a client computer device is located within a geofence. Changes in preference data can be dependent on changes of a user's user associated data iteratively received at block 1112 and can be in dependence e.g. on changes with respect to (a) application data of client computer device such as changes to fitness application data of a user, nutrition application data of a user, and/or calendar application data of a user; biometric data of a user as output e.g. by a biometric sensor device incorporated in a client computer device e.g. as may be provided by a smartwatch; and/or (c) posts data of a user posted under a user's social media account within social media system 160.

The instantiated VM instantiated at block 1110 can remain instantiated for a time period that a breaching client computer device remains within an established geofence associated to enterprise venue 142. An instantiated VM for a time period that a breaching client computer device remains within a geofence can iteratively perform secure inputting at block 1112, AI processing at block 1113 and secure outputting of data at block 1115. An instantiated VM performing secure outputting data at block 1115 can include an instantiated VM outputting determined data values without exposure of input data input to the VM at block 1112 and without exposure of an underlying process to return a determined data value output at block 1115. In response to a determination by enterprise system 110 at block 1116 that a breaching client computer device is no longer within a geofence, enterprise system 110 can proceed to block 1117.

At block 1117 in response to breaching client computer device exiting a geofence, enterprise system 110 can perform deleting of the instantiated VM instantiated at block 1110. Time of instantiation of a VM at block 1110 resources can be allocated for the VM to be instantiated. According to one embodiment, the VM that is instantiated at block 1110 can include a memory resource allocation so that allocated memory for a VM is restricted to non-persistent memory and an instantiated VM can be configured so that any data stored within an allocated memory of a VM for the lifetime of the VM is automatically deleted in response to deletion of the VM. In response to completion of delete VM block 1117, enterprise system 110 can proceed to block 1118 to update ledger 150.

Enterprise system 110 at block 1118 can send container deletion confirmation data to ledger 150 for receipt by ledger 150 at block 1502. In response to receipt of container deletion confirmation data at block 1502, ledger 150 can responsively record in ledger 150, e.g. as a blockchain block, a record of a transaction wherein the transaction is the transaction provided by the deletion of an instantiated VM at block 1117 accompanied by deletion of all stored data stored within an allocated memory of the VM during the lifetime of the VM. As set forth herein, a registered user of system 100 can be granted access to ledger 150, e.g. can have at least viewing rights to ledger 150 so that any registered user can confirm deletion of any temporarily stored user associated data within a VM by viewing records of ledger 150, e.g. with use of displayed ledger area 5040 of user interface 5000. Enterprise system 110 in response to completion of block 1118 can proceed to block 1119.

At block 1119 enterprise system 110 can return to block 1102 to send any installation package updates to client computer devices of client computer devices 130A-130Z for receipt by client computer devices 130A-130Z at block 1302 and for sending query data to client computer devices 130A-130Z for return of data, such as location data of client computer devices 130A-130Z and in some cases, user associated data, e.g. user associated data from applications running on client computer devices 130A-130Z. According to one embodiments enterprise system 110 having VM pool 120 can be external and remote from venue system 140. According to another embodiment VM pool 120 and optional other components of enterprise system 110 can be co-located with venue system 140, e.g. on a private network resource (e.g. one or more computing node 10) of venue system 140. Instantiation of VM pool 120 within a private network can enhance data security and further remove potential to siphon data such as including user associated data transmitted over public physical network infrastructure.

The system and method set forth herein explains how disparate data sets of known information can be analyzed, use a learning model to create informed decisions, and then interface with IoT devices and a phone and other data to set personal privacy and other parameters, including setting alarms or do-not-disturb on a phone to extend to a hotel room, for example. Then, after a patron user e.g. traveler leaves an enterprise venue e.g. a hotel or the stay has ended (as up to the traveler) the geo-fencing recognizes the traveler has gone and deletes the user associated data. In a food service context, where a nutrition application running on a client computer device can share with a food service provider showing that the diner has 300 calories left and 0 carbs in their diet, and therefore should be guided to the fish and green salad menu. Again, after the diner leaves, the information from the nutrition application can be deleted.

Example

Arriving at an enterprise venue hotel after a long international flight, it is still pre-noon morning time for a patron user. The user is exhausted. The user wants to sleep for 2 hours and then get up so the user can be up until late that night to get time zone acclimated; after-which the user can go to bed and sleep through the night time in local time zone. After this two hour power-nap, the user will be fresh for the client meetings next morning. The user sets an alarm clock, sets the "do not disturb" sign outside the user's door, puts his or her cell phone on "do-not-disturb" for 2 hours so no one can call and wake the user up. The user draw the curtains and falls asleep . . . 20 minutes later, already in a deep asleep, the room phone in the bathroom (which the user did not know about) rings loudly. The user wakes up, answer the phone. It is the hotel guest services calling to inquire how my stay is going so far. The user politely tell them it's OK and holds calls. Then the user tried to go back to sleep but can't. The call has affected the user's entire plan and can no longer follow the sleep plan that had been set up. The user is up for few more hours. Then, against the user's plan, the user falls asleep early that evening. As a result, the user is wide awake at 2:30 am local time waiting for the next meeting to start at 8 am. It is a six hour client meeting and the user knows he or she will be exhausted and sleepy even as it is starting in the morning.

End of Example

Embodiments herein recognize that client computer devices including e.g. smartphones, wearables, and other IoT-enabled devices contain a myriad of information which can be interrogated and used to maximize sleep and other travel related functions. For example (but not limited to): (A) Sleep Pattern information—average sleep times, normal bedtime/wakeup time; (B) Calendar information—what time is a user's next meeting, and where; (C) Location information—where the user is in relation to the user's next meeting; (D) Nutrition information—what are the user's eating patterns when travelling versus at home; (E) Other personal information that might be manually entered and/or derived.

Data can be examined in a manner to make decisions, and interface with other devices such as IoT sensors and control systems. To ensure that the data is not kept, sold, and reused after the need for the data is done. IoT devices and cellphone applications can provide information, and also take specific actions based on well-structured and published APIs: (A) Temperature Controls—report current temperature, set room climate preferences; (B) Lighting—what is the current ambient light levels, turn lights up/down; (C) Window/Curtain controls—open/close windows for fresh air, open/close curtains for light and/or privacy; (D) Room Privacy—enable/disable Do not Disturb on the external door controls, enabled/disable door bells; (E) Phone Controls—disable phone "bell" (ringer), disable alert lights (e.g. Message warning); (F) TV/entertainment—turn on/off/control entertainment systems, etc.

Based on user-defined criteria, when leaving an agreed geo-fenced location, the user associated data previously exposed, can be removed—leaving only pre-agreed metadata/other information behind. For example, the purchase of a low carbohydrate meal will remain on a billing system but not the dietary information that was shared and used to derive a recommendation for that specific meal. Specific dietary information that may be deleted can include history of food eaten and the type of diet.

Geofencing can be provided so that there is a location-based service that denotes when the user is inside of the geofence area of choice. This location could be building-aware (e.g. an enterprise venue such as hotel, restaurant, retail store, or professional services office); city-aware (New York); country-aware (United States); or even enterprise-aware.

Data requirements by an enterprise (e.g. operator of a hotel or restaurant or other enterprise venue) would have access to the IoT data of the guest as listed above. This data can be contained in a virtual machine such as a container based VM for ease of use. At the time the user exits the defined geofence the detail data can be deleted and can leave metadata.

Certain embodiments herein may offer various technical computing advantages for improving the operation of computer systems and computer networks. Embodiments herein can feature automated adaptations to satisfy service and/or environment condition needs of a user to thereby avoid numerous manually initiated queries of a user using a variety of network resources to satisfy such needs. Embodiments herein can include location based services, wherein computer system actions are automatically performed without manual input of a user, thereby relieving and reducing operations to be manually performed by a user or a set of users. Embodiments herein can provide location based services wherein based on a user breaching a geofence associated to a enterprise venue a user securely grants access to user associated data of the user to an enterprise operating the venue for use by the enterprise to customize and optimize services to the user. Features can include for guaranteed secure delivery and use of user associated data to an enterprise and guaranteed user associated data destruction by the enterprise. Features can be employed for enhanced data security, e.g. automated container instantiation destruction based on geofence processing. Features can include use of a ledger, such as a blockchain ledger, for providing guaranteed container and user associated data destruction. Embodiments herein can include the automatic instantiation of a VM in dependence on a geofence breach in an automatic deletion of a VM and accompanying data in response to an exiting of a geofence. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription. The static optimization service may be provided for subscribed business entities and/or individuals in need from any location in the world.

Figure 8:
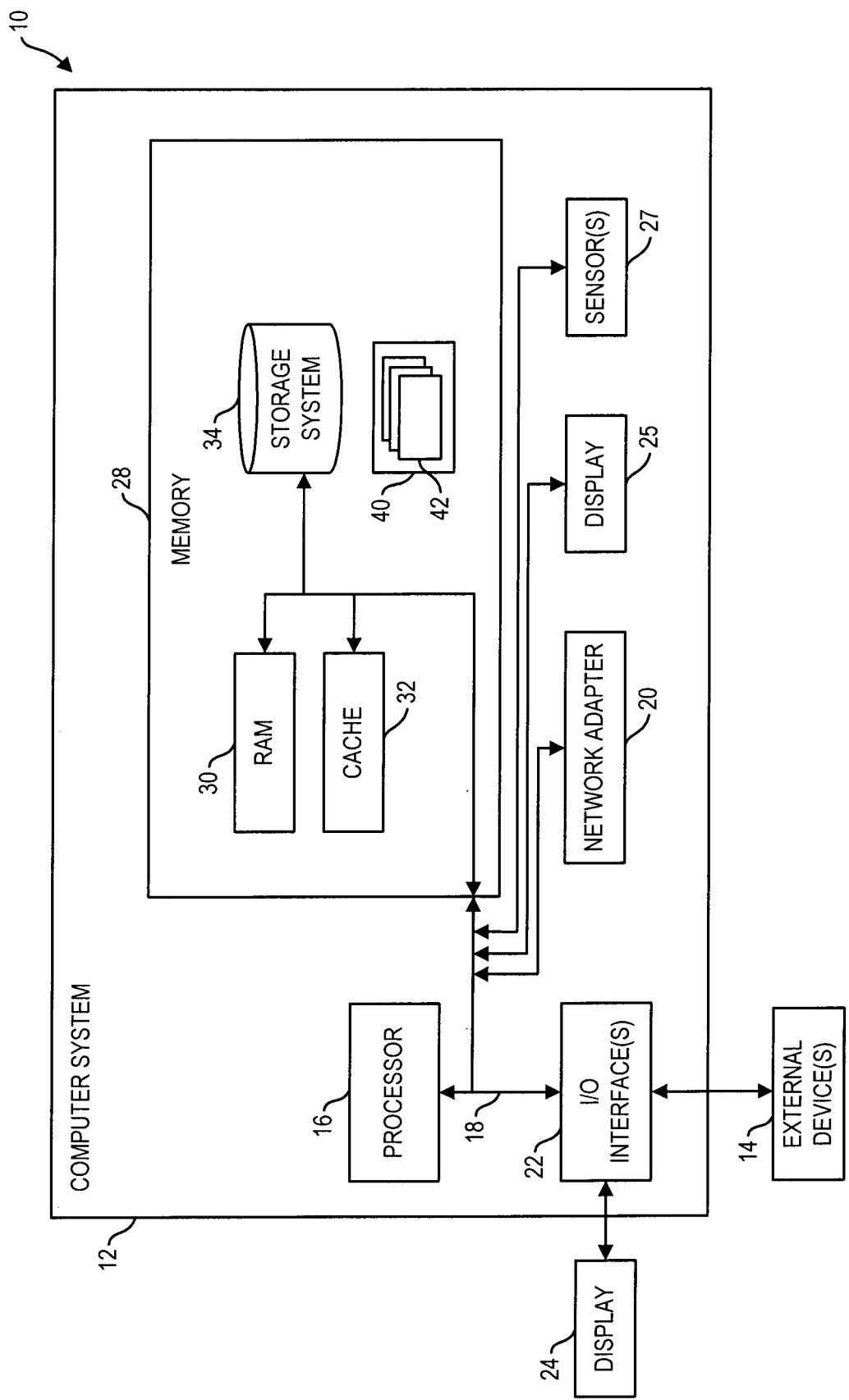
FIG. 8 depicts a computing node according to one embodiment.
Figure 9:
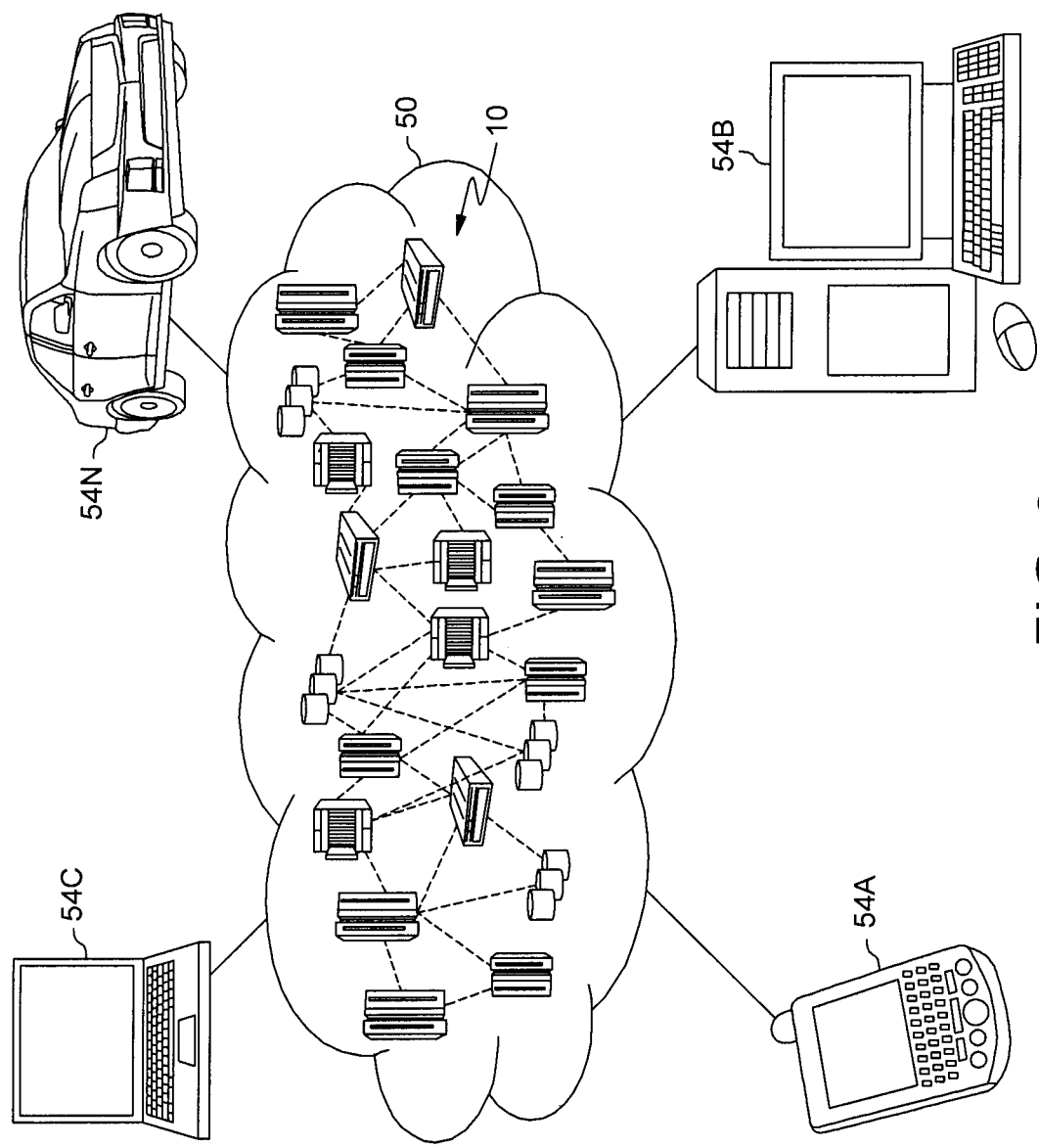
FIG. 9 depicts a cloud computing environment according to one embodiment.
Figure 10:
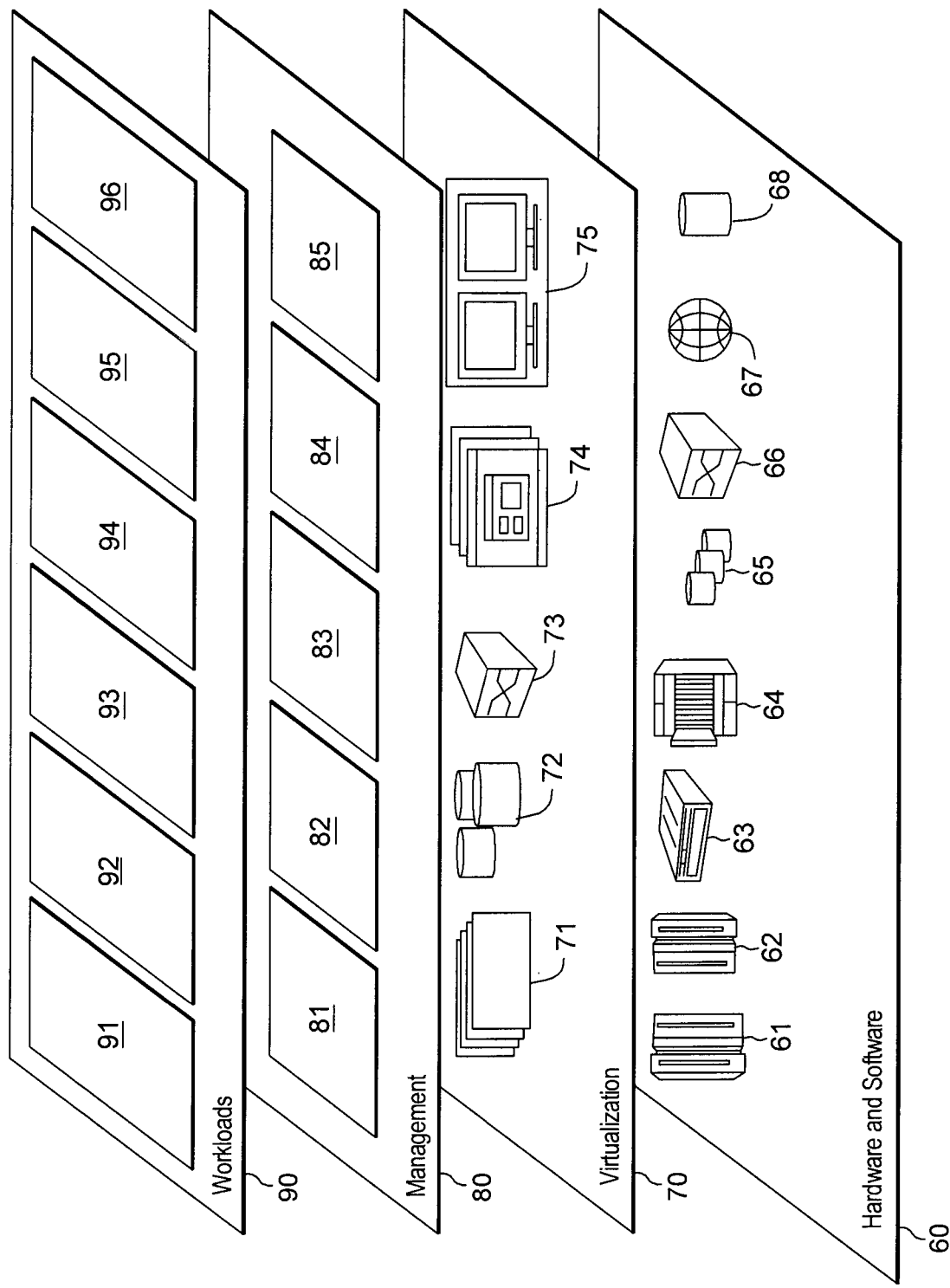
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, enterprise system 110 can include one or more computing node 10 and can include one or more program 40 for performing functions described with reference to method 200 of FIG. 3 and functions and functions described with reference to enterprise system 110 as set forth in the flowchart of FIGS. 4A-4B. In one embodiment, one or more client computer device 130A-130Z can include one or more computing node 10 and can include one or more program 40 for performing functions described with reference to one or more client computer device 130A-130Z as set forth in the flowchart of FIGS. 4A-4B. In one embodiment, venue system 140 can include one or more computing node 10 and can include one or more program 40 for performing functions described with reference to venue system 140 as set forth in the flowchart of FIGS. 4A-4B. In one embodiment, social media system 160 can include one or more computing node 10 and can include one or more program 40 for performing functions described with reference to social media system 160 as set forth in the flowchart of FIGS. 4A-4B. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor (e.g. an air and/or body temperature sensor), a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for obtaining and using user data as set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    examining location data of a client computer device in reference to a geofence, the client computer device being associated to a certain user, the geofence being associated to a certain enterprise venue;
    in response to a breach of the geofence by the client computer device, initiating a process to obtain user associated data of the certain user;
    providing, while the client computer device is located within the geofence, one to more output observable by the certain user in dependence on data of the user associated data obtained by the initiated process; and
    in response to an exiting of the geofence by the client computer device terminating the process to obtain user associated data of the certain user.

2. The computer implemented method of claim 1, wherein the method includes in response to the exiting of the client computer device of the geofence initiating a deletion process to delete data of the user associated data obtained by the initiated process.

3. The computer implemented method of claim 1, wherein the initiating the process to obtain user associated data of the certain user includes instantiating a virtual machine, the virtual machine configured for obtaining the user associated data.

4. The computer implemented method of claim 1, wherein the terminating the process to obtain user associated data of the certain user includes deleting a virtual machine instantiated for the obtaining of the user associated data.

5. The computer implemented method of claim 1, wherein the initiating the process to obtain user associated data of the certain user includes instantiating a virtual machine, the virtual machine configured for obtaining the user associated data, and wherein the terminating the process to obtain user associated data of the certain user includes deleting the virtual machine instantiated for the obtaining of the user associated data.

6. The computer implemented method of claim 1, wherein the initiating the process to obtain user associated data of the certain user includes instantiating a virtual machine, the virtual machine configured for obtaining the user associated data, and wherein the terminating the process to obtain user associated data of the certain user includes deleting the virtual machine instantiated for the obtaining of the user associated data, and wherein the virtual machine is instantiated on a local one or more computing node located within the enterprise venue.

7. The computer implemented method of claim 1, wherein the user associated data includes data obtained from the client computer device.

8. The computer implemented method of claim 1, wherein the user associated data includes data from social media system account of the certain user.

9. The computer implemented method of claim 1, wherein the user associated data includes data obtained from the client computer device, and wherein the user associated data includes data from social media system account of the certain user.

10. The computer implemented method of claim 1, wherein the method includes in response to the exiting of the client computer device of the geofence initiating a deletion process to delete data of the user associated data obtained by the initiated process, wherein the method includes recording in an immutable blockchain ledger a record of a transaction defined by the deletion process to delete data of the user associated data, and wherein the method include permitting access to the certain user of the immutable blockchain ledger.

11. The computer implemented method of claim 1, wherein the initiating the process to obtain user associated data of the certain user includes instantiating a virtual machine, the virtual machine configured for obtaining the user associated data, and wherein memory resources of the instantiated virtual machine are restricted to volatile memory resources, wherein the method includes in response to the exiting of the client computer device of the geofence initiating a deletion process to delete data of the user associated data obtained by the initiated process, wherein the deletion process to delete data of the user associated data includes deleting the instantiated virtual machine.

12. The computer implemented method of claim 1, wherein the one or more output includes an output to control a temperature within the enterprise venue.

13. The computer implemented method of claim 1, wherein the one or more output includes an output to include lighting within the enterprise venue.

14. The computer implemented method of claim 1, wherein the one or more output includes an output to display a customized food menu customized for the certain user.

15. The computer implemented method of claim 1, wherein the one or more output includes each of (a) an output to display a customized food menu customized for the certain user, (b) an output to include lighting within the enterprise venue, and an output to display a customized food menu customized for the certain user.

16. The method of claim 1, wherein the obtained user associated data includes data of a nutrition application running on the client computer device, and wherein the wherein the one or more output includes an output to display a customized food menu customized for the certain user.

17. The method of claim 1, wherein the user associated data includes web browsing history data stored on the client computer device and wherein the one or more output is an output to display a menu specifying electronic entertainment content for selection by the user, the menu being configured in dependence on the web browsing data, and wherein method includes responsively playing selected electronic content of the certain user in response to a selection of the certain user using the displayed menu.

18. The method of claim 1, wherein the user associated data includes body temperature data and pulmonary data of the certain user, wherein the user associated data includes web browsing history data stored on the client computer device and wherein the one or more output is an output to display a menu specifying electronic entertainment content for selection by the user, the menu being configured in dependence on the web browsing data, and wherein method includes responsively playing selected electronic content of the certain user in response to a selection of the certain user using the displayed menu, wherein the one or more output includes an output to control a temperature within the enterprise venue in dependence on data of the body temperature data of the user associated data that specifies a body temperature of the certain user, wherein the client computer device is provided by a smartwatch worn by the certain user, the smart watch incorporating a body temperature sensor, wherein the one or more output includes an output to control lighting within the enterprise venue in dependence on data of the pulmonary data of the user associated data, wherein the smartwatch incorporates a pulmonary sensor for output of the pulmonary data, wherein the one or more output includes an output to display a customized food menu customized for the certain user in dependence on data of the user associated data that is obtained from a nutrition application running on the client computer device, wherein the one or more output includes an output to control a telephone within the enterprise venue in dependence on calendar data of the user associated data, the calendar data obtained from a calendar application running on the client computer device, wherein the initiating the process to obtain user associated data of the certain user includes instantiating a virtual machine, the virtual machine configured for obtaining the user associated data, and wherein memory resources of the instantiated virtual machine are restricted to volatile memory resources, wherein the method includes in response to the exiting of the client computer device of the geofence initiating a deletion process to delete data of the user associated data obtained by the initiated process, wherein the deletion process to delete data of the user associated data includes deleting the instantiated virtual machine, wherein the method includes recording in an immutable blockchain ledger a record of a transaction defined by the deletion process to delete data of the user associated data, and wherein the method include permitting access to the immutable blockchain ledger by the certain user.

19. The computer implemented method of claim 1, wherein the initiating the process to obtain user associated data of the certain user includes instantiating a virtual machine, the virtual machine configured for obtaining the user associated data, wherein the instantiating the virtual machine includes allocating resources to the virtual machine, wherein the allocating resources to the virtual machine includes allocating memory resources to the virtual machine so that memory resources of the instantiated virtual machine are restricted to volatile memory resources, wherein the terminating the process to obtain user associated data of the certain user in response to the exiting of the geofence by the client computer device includes deleting the virtual machine instantiated for the obtaining of the user associated data, wherein the deleting the virtual machine instantiated for the obtaining of the user associated data deletes the user associated data obtained by the initiating a process to obtain user associated data of the certain user.

20. The computer implemented method of claim 1, wherein the one or more output includes an output to control lighting within the enterprise venue.

* * * * *